(12) United States Patent
Niikawa et al.

(10) Patent No.: US 7,913,827 B2
(45) Date of Patent: Mar. 29, 2011

(54) ELECTROMAGNETIC ACTUATOR, ELECTROMAGNETIC CLUTCH INCLUDING SAID ELECTROMAGNETIC ACTUATOR, AND DRIVING FORCE TRANSMITTING APPARATUS FOR VEHICLE INCLUDING SAID ELECTROMAGNETIC CLUTCH

(75) Inventors: Yoshihiro Niikawa, Kariya (JP); Kunihiko Suzuki, Gamagoori (JP); Motoshi Kawamura, Nara (JP)

(73) Assignee: JTEKT Corporation, Osaka-shi (JP)

( * ) Notice: Subject to any disclaimer, the term of this patent is extended or adjusted under 35 U.S.C. 154(b) by 615 days.

(21) Appl. No.: 11/748,859

(22) Filed: May 15, 2007

(65) Prior Publication Data

US 2007/0262838 A1     Nov. 15, 2007

(30) Foreign Application Priority Data

| May 15, 2006 | (JP) | ................................ 2006-134858 |
| Dec. 15, 2006 | (JP) | ................................ 2006-338390 |
| Dec. 19, 2006 | (JP) | ................................ 2006-341362 |

(51) Int. Cl.
*F16D 27/115* (2006.01)
*B60K 17/34* (2006.01)

(52) U.S. Cl. .................. 192/84.2; 192/84.91; 192/84.93

(58) Field of Classification Search ................ 192/84.2, 192/84.93; 335/250
See application file for complete search history.

(56) References Cited

U.S. PATENT DOCUMENTS

| 586,006 | A | * | 7/1897 | De Bovet | ........................ 192/84.5 |
| 1,031,081 | A | * | 7/1912 | Miram et al. | ................. 192/84.2 |
| 2,021,534 | A | * | 11/1935 | Worgan | ........................ 192/84.2 |
| 2,070,813 | A | * | 2/1937 | Stearns et al. | ................ 192/84.2 |
| 2,693,263 | A | * | 11/1954 | Becking | ........................ 192/84.2 |
| 3,669,232 | A | * | 6/1972 | Rohweder et al. | ........... 192/85 A |
| 6,761,662 | B2 | | 7/2004 | Iwazaki et al. | |
| 6,943,655 | B1 | * | 9/2005 | McMahon et al. | ............ 335/202 |
| 7,097,019 | B2 | * | 8/2006 | Ronk et al. | ................. 192/84.91 |
| 2002/0112932 | A1 | * | 8/2002 | Gradu | .......................... 192/84.7 |
| 2006/0042908 | A1 | | 3/2006 | Ronk et al. | |

FOREIGN PATENT DOCUMENTS

| EP | 1 348 881 A1 | 10/2003 |
| JP | 2003-148517 | 5/2003 |
| JP | 2004-228068 A | * 8/2004 |
| JP | 2005-188560 | 7/2005 |
| JP | 2006-83723 | 3/2006 |

OTHER PUBLICATIONS

Extended European Search Report issued Sep. 13, 2010 in EP Application No. 07108255.6.

\* cited by examiner

*Primary Examiner* — Rodney H Bonck
(74) *Attorney, Agent, or Firm* — Oblon, Spivak, McClelland, Maier & Neustadt, L.L.P.

(57) ABSTRACT

An electromagnetic actuator includes a supporting member supporting an electromagnetic coil around which a wire is wound, a moving member positioned facing the supporting member so as to move forward and backward, and an actuating force transmitting member transmitting moving force of the moving member to a member to be actuated as an actuating force. The moving member is moved towards the supporting member by magnetic force generated by applying an electric current to the electromagnetic coil to apply the actuating force to the member to be actuated via the actuating force transmitting member. The electromagnetic coil includes a plurality of electromagnetic coils provided at the supporting member.

23 Claims, 7 Drawing Sheets

ELECTROMAGNETIC ACTUATOR, ELECTROMAGNETIC CLUTCH INCLUDING SAID ELECTROMAGNETIC ACTUATOR, AND DRIVING FORCE TRANSMITTING APPARATUS FOR VEHICLE INCLUDING SAID ELECTROMAGNETIC CLUTCH

CROSS REFERENCE TO RELATED APPLICATIONS

This application is based on and claims priority under 35 U.S.C. §119 with respect to Japanese Patent Application No. 2006-338390 filed on Dec. 15, 2006, Japanese Patent Application No. 2006-134858 filed on May 15, 2006 and Japanese Patent Application No. 2006-341362 filed on Dec. 19, 2006 the entire content of which are incorporated herein by reference.

FIELD OF THE INVENTION

The present invention relates to an electromagnetic actuator, an electromagnetic clutch including the electromagnetic actuator, and a driving force transmitting apparatus for a vehicle including the electromagnetic clutch.

BACKGROUND

A known electromagnetic actuator includes a supporting member (yoke) which supports an electromagnetic coil around which a wire is wound, a moving member (armature) which is positioned facing the supporting member so as to move forward and backward, an actuating force transmitting member which transmits moving force of the moving member to a member to be actuated as actuating force. According to the known electromagnetic actuator, the moving member is moved towards the supporting member by an effect of magnetic force generated by applying electric current to the electromagnetic coil and the actuating force is provided to the member to be actuated via the actuating force transmitting member. An above-described type of electromagnetic actuator is adopted as a part of an electromagnetic clutch such as a differential. An above-described electromagnetic clutch is adopted as a part of a driving force transmitting apparatus for a vehicle (See JP2003-148517A).

With the construction of the known electromagnetic actuator, although it is required to provide large degree of the actuating force to the member to be actuated in order to properly operate the member to be actuated, a structure which generates large degree of actuating force which is applicable, for example, to a driving force transmitting apparatus for a vehicle by an electromagnetic actuator per se has not been proposed. Accordingly, with construction of a driving force transmitting apparatus described in JP2003-148517A, in order to cope with the foregoing, an actuating force increasing mechanism such as a cam mechanism is adopted to increase the actuating force generated by the electromagnetic actuator and to transmit to a clutch mechanism serving as the member to be actuated.

Notwithstanding, in case the aforementioned actuating force increasing mechanism is adopted to construct an electromagnetic clutch or a driving force transmitting apparatus for a vehicle, the number of parts of the electromagnetic actuator increases and the construction of the electromagnetic actuator becomes complex because of the actuating force increasing mechanism. This brings a drawback that construction of an electromagnetic clutch or a driving force transmitting apparatus for a vehicle become complex and dimensions thereof are increased by applying the actuating force increasing mechanism.

Further, according to the known electromagnetic clutch or the driving force transmitting apparatus for the vehicle having the actuating force increasing mechanism, length of a magnetic path which is formed by applying an electric current to the electromagnetic coil is consequently increased, which increases reluctance, decreases magnetic flux density, and, thus decreases attraction force relative to the moving member (armature). Further, according to the actuating force increasing mechanism and the electromagnetic actuator which includes the actuating force increasing mechanism, there is a drawback that drag torque generated in the actuating force increasing mechanism and the electromagnetic actuator is increased and transmitted to the member to be actuated because of the foregoing structure.

On the other hand, another type of known electromagnetic actuator (electromagnetic coil device) which is devised to be downsized and to generate adequate electromagnetic force has been proposed (See JP2005-188560A). According to the known electromagnetic coil device described in JP2005-188560A, the electromagnetic coil is divided into plural pieces so as to be small, and electrical resistance of the electromagnetic coil is reduced by downsizing the electromagnetic coil, and, thus to exert adequate electromagnetic force. However, the known electromagnetic coil described in JP2005-188560A does not move the moving member by the attraction force of the electromagnetic force, and, thus does not apply the moving force to the member to be actuated via the actuating force transmitting member.

A need thus exists for an electromagnetic actuator which generates large degree of actuating force for properly operating a member to be actuated, an electromagnetic clutch including the electromagnetic actuator, and a driving force transmitting apparatus for a vehicle including the electromagnetic clutch.

SUMMARY OF THE INVENTION

In light of the foregoing, the present invention provides an electromagnetic actuator, which includes a supporting member supporting an electromagnetic coil around which a wire is wound, a moving member positioned facing the supporting member so as to move forward and backward, and an actuating force transmitting member transmitting moving force of the moving member to a member to be actuated as an actuating force. The moving member is moved towards the supporting member by magnetic force generated by applying an electric current to the electromagnetic coil to apply the actuating force to the member to be actuated via the actuating force transmitting member. The electromagnetic coil includes a plurality of electromagnetic coils provided at the supporting member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

One embodiment of the present invention will be explained with reference to illustrations of drawing figures as follows.

Figure 1:
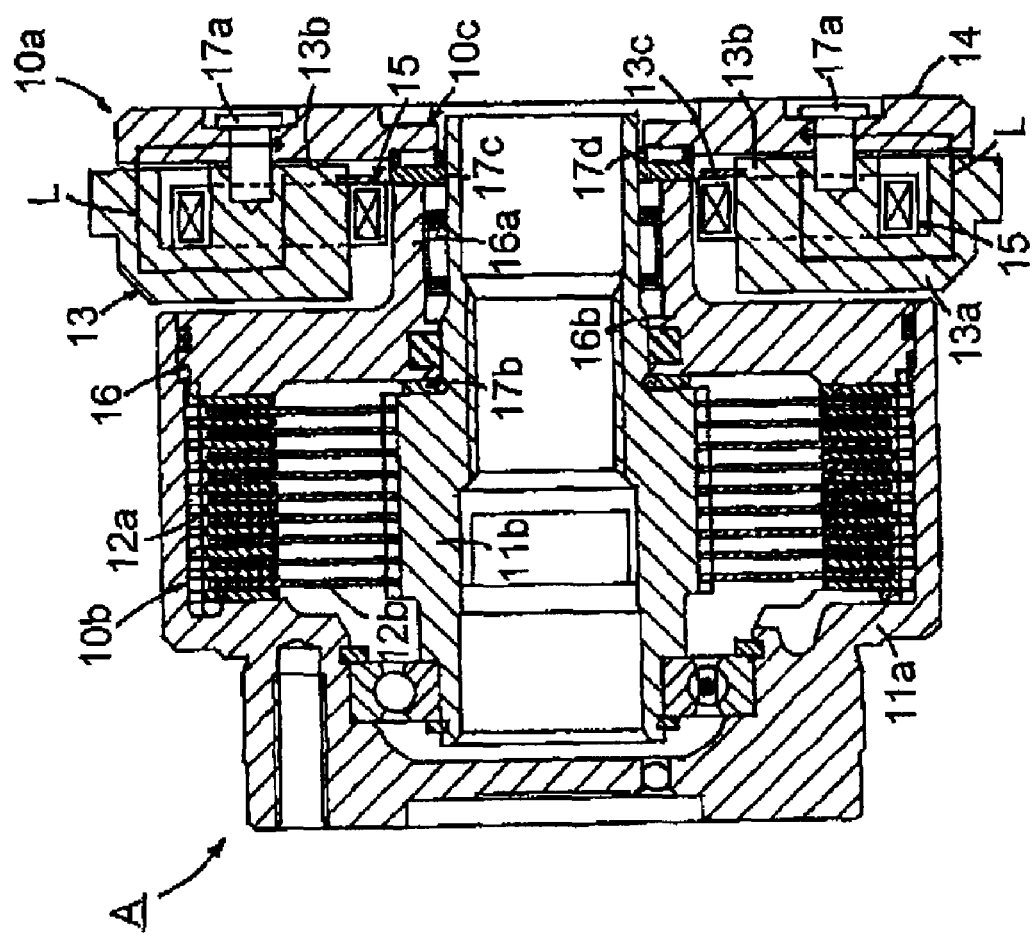
FIG. 1 is a cross-sectional view of a first electromagnetic clutch according to an embodiment of the present invention.

As shown in FIG. 1, an electromagnetic clutch A (i.e., serving as a first electromagnetic clutch) connects a driveshaft and a driven shaft so as to transmit torque when operated and disconnects the driveshaft and the driven shaft when not operated, for example, in a state where the electromagnetic clutch A is arranged between the driveshaft and the driven shaft of the front wheel and/or rear wheel driving vehicle. The electromagnetic clutch A includes an electromagnetic actuator 10a and a clutch mechanism 10b serving as a member to be actuated which is controlled by the actuator 10a.

The electromagnetic clutch A includes an outer housing 11a serving as an outer rotation member, an inner shaft 11b serving as an inner rotation member, the electromagnetic actuator 10a assembled on an outer periphery of the inner shaft 11b, and the clutch mechanism 10b housed in a clutch housing formed by the outer housing 11a, the inner shaft 11b, and the electromagnetic actuator 10a. The inner shaft 11b is positioned in the outer housing 11a coaxially thereto penetrating through the actuator 10a to be liquid tight and rotatable. In those circumstances, the inner shaft 11b is rotatably supported in the outer housing 11a.

The clutch mechanism 10b is a multiple disc type clutch mechanism including plural outer clutch plates 12a and plural inner clutch plates 12b. Each outer periphery of the outer clutch plates 12a is fitted to a spline formed on an inner periphery of the outer housing 11a to be assembled so as to move in an axial direction. The inner clutch plates 12b are arranged alternately to the outer clutch plates 12a, and each inner periphery of the inner clutch plates 12b is fitted to a spline formed on an outer periphery of the inner shaft 11b to be assembled so as to move in the axial direction.

The electromagnetic actuator 10a (i.e., serving as an electromagnetic actuator) includes a yoke 13 (i.e., serving as a supporting member) which supports electromagnetic coils 15, an armature 14 (i.e., serving as a moving member), the electromagnetic coils 15 (e.g., six electromagnetic coils) arranged circumferentially on the yoke 13, and an operating piston 16 (i.e., serving as an actuating force transmitting member). The yoke 13 is shaped in a thick disc form having a through hole penetrating in the center. A disc shaped yoke body 13a is formed with elliptical protrusions 13b (e.g., six elliptical protrusions) on a side thereof. Each protrusion 13b is arranged circumferentially on the yoke body 13a with equally spaced intervals therebetween to fit to the corresponding electromagnetic coil 15 and to be assembled. The electromagnetic coil 15 is a cylindrical body having an ellipse in cross-section and around which a wire is wound a predetermined number of times. The electromagnetic coil 15 is fitted to the corresponding protrusion 13b of the yoke body 13a and is assembled to the yoke 13a via a circlip 13c.

The armature 14 serving as a moving member included in the electromagnetic actuator 10a is shaped in a disc form which is thinner than the yoke 13 and has a circular through hole in the center. The armature 14 is assemble to a first side of the yoke 13 by pins 17a and is positioned facing the first side of the yoke 13 so as to advance or retract (move forward or backward) relative to the first side of the yoke 13. A tip end portion of a leg portion of the pin 17a is press-fitted to a press-fitting hole which is provided approximately in the center of each protrusion 13b of the yoke 13 while penetrating through each assembling hole formed on the armature 14. Accordingly, the pin 17a supports the armature 14 so as to be movable relative to the yoke 13 and so as not to fall out. An assembly of the yoke 13, the armature 14, and the electromagnetic coil 15 integrally assembled by the pin 17a serves as an assembly 10c. The assembly 10c is rotatably fitted on the inner shaft 11b. Hereinafter, the assembly 10c is referred to as an actuator assembly 10c.

The operating piston 16 included in the electromagnetic actuator 10a includes a cylindrical body 16a and a large diameter disc shaped pressing body 16b integrally formed with an end of the cylindrical body 16a. Before assembling the actuator assembly 10c which integrally includes the yoke 13, the armature 14, and the electromagnetic coil 15 onto the operating piston 16, the operating piston 16 is inserted onto the inner shaft 11b from a first end thereof and provided on an outer periphery of the inner shaft 11b to be liquid tight and rotatable. Further, the operating piston 16 is assembled to an inside of an opening of a first end of the outer housing 11a to be liquid tight and rotatable. In a state when assembled in the foregoing manner, the operating piston 16 forms the clutch housing together with the outer housing 11a and the inner shaft 11b and faces the inner shaft 11b via a spring 17b provided at a stepped portion of the inner shaft 11b. The spring 17b retains the disc shaped pressing body 16b and a first side of a clutch plate included in the clutch mechanism 10b to have a predetermined distance from each other, and, consequently, retains plural clutch plates 12a, 12b of the clutch mechanism 10b adjacent to one another to have a predetermined distance from one another.

The actuator assembly 10c included in the electromagnetic actuator 10a is positioned at a rear end side of the cylindrical body 16a of the operating piston 16 assembled in a foregoing manner via a spacer 17c and a needle bearing 17d on a first end portion of the inner shaft 11b. And the actuator assembly 10c is assembled to a case which covers the electromagnetic clutch A via an outer periphery of the yoke 13. Accordingly, the actuator assembly 10c prevents the operating piston 16 from falling out (being displaced), and retains a clearance between the yoke 13 and the armature 14, that is, an air gap of the electromagnetic actuator 10a to be a predetermined distance other than zero.

According to the electromagnetic clutch A including the electromagnetic actuator 10a and the clutch mechanism 10b serving as a member to be actuated, the outer housing 11a and the inner shaft 11b are configured to be connected to transmit torque by applying an electric current having a predetermined voltage to each of the electromagnetic coils 15 of the actuator assembly 10c to operate the clutch mechanism 10b to connect. In a state where the clutch mechanism 10b is connected, torque inputted from one of the outer housing 11a and the inner shaft 11b is outputted to the other of the outer housing 11a and the inner shaft 11b.

According to the electromagnetic clutch A, when the electric current is applied to each of the electromagnetic coils 15 included in the electromagnetic actuator 10a, a magnetic path L which circulates between the yoke 13 and the armature 14 is formed at portions at which the electromagnetic coils 15 are provided (See arrow with solid line in FIG. 1). Magnetic force deriving from the magnetic path L formed at each portion provided with the electromagnetic coil 15 is integrated as attraction force to attract the armature 14. Consequently, the armature 14 moves towards the yoke 13, pushes the operating piston 16 by the force corresponding to the attraction force, and the operating piston 16 evenly pushes all of the clutch plates 12a, 12b of the clutch mechanism 10b via the spring 17b. Accordingly, the clutch mechanism 10b is engaged, so that the outer housing 11a and the inner shaft 11b are connected to transmit the torque. In those circumstances, the torque inputted from one of the outer housing 11a and the inner shaft 11b can be outputted to the other of the outer housing 11a and the inner shaft 11b.

Because the attraction force applied to the armature 14 varies depending on the degree of the electric current applied to the electromagnetic coil 15, by controlling the electric current applied to the electromagnetic coil 15, the engaging force of the clutch mechanism 10b can be controlled The electric current applied to the electromagnetic coil 15 can be adjusted, for example, by applying pulse width modulation control (PWM control) to the power supply voltage. As explained above, because the clearance between the yoke 13 and the armature 14 is ensured by the spacer 17c, there is no drawback that the engaging force of the clutch mechanism 10b cannot be controlled by a contact of the yoke 13 and the armature 14.

According to the electromagnetic clutch A, when the application of the electric current to each of the electromagnetic coils 15 is stopped, the magnetic path L formed at the electromagnetic coil 15 fades, and the attraction force applied to the armature 14 is lost. Consequently, the pushing force of the armature 14 to push the operating piston 16 is lost, the operating piston 16 returns to an initial position by biasing force of the spring 17b, and simultaneously, the armature 14 returns to an initial position. Accordingly, the electromagnetic clutch A is disengaged.

According to the electromagnetic clutch A, the moving force of the armature 14 deriving from the magnetic force generated at the electromagnetic actuator 10a is transmitted to the clutch mechanism 10b serving as the member to be actuated as actuating force via the operating piston 16 to operate (connect) the clutch mechanism 10b. The electromagnetic actuator 10a is provided with plural electromagnetic coils 15 circumferentially arranged with even intervals so that the magnetic path L is formed at the portions provided with the electromagnetic coils 15. With the construction of the electromagnetic actuator 10a, the degree of magneto motive force generated at the electromagnetic actuator 10a is high, and the magnetic force deriving from the magnetic path L formed by each of the electromagnetic coils 15 integrally affects the armature 14. Consequently, the armature 14 moves by large degree of attraction to apply large degree of actuating force to the clutch mechanism 10b via the operating piston 16.

Accordingly, the electromagnetic actuator 10a of the electromagnetic clutch A effectively functions as an actuator for the clutch mechanism 10b which requires large degree of actuating force, and an actuating force increasing means such as a cam mechanism which is essential for known electromagnetic clutches can be omitted. Further, the increasing size and the complication of the structure of the electromagnetic clutch in which the electromagnetic actuator 10a and the clutch mechanism 10b are integrally assembled can be prevented.

According to the electromagnetic actuator 10a of the electromagnetic clutch A, at least three electromagnetic coils 15 (i.e., six in this embodiment) are circumferentially arranged with even intervals at the yoke 13. Accordingly, the attraction force deriving from the magnetic force of the magnetic path formed by the electromagnetic coil 15 evenly affects the entire surface of the armature 14 to attract the armature 14. Accordingly, the armature 14 moves towards the yoke 13 maintaining a stable attitude without tilting relative to the yoke 13 or without wobbling or rotating, which allows the electromagnetic actuator 10a to generate stable actuating force.

According to the electromagnetic actuator 10a of the electromagnetic clutch A, each of the electromagnetic coils 15 is assembled to the yoke 13 in a state where each of the electromagnetic coils 15 is fitted to the corresponding protrusions 13b which are circumferentially arranged with even intervals and is prevented from falling out (displacing) by means of the circlip 13c. Accordingly, the yoke 13 and the electromagnetic coils 15 serve as an assembly, which improves the readiness for assembling the yoke 13 and the electromagnetic coils 15 to the clutch mechanism 10b which serves as the member to be actuated.

According to the electromagnetic actuator 10a of the electromagnetic clutch A, the armature 14 is in connection with the yoke 13 via the connecting pin 17a to be movable in a forward and backward direction by a predetermined length relative to the yoke 13 in a state where the rotation is restricted. Thus, the wobble and the rotation of the armature 14 when moving towards the yoke 13 can be prevented and the armature 14 can be moved towards the yoke 13 keeping a stable attitude. Consequently, stable actuating force can be generated and the decline of the durability of the armature 14 because of the wobble and the rotation can be restrained. Further, by adopting the connecting structure of the armature 14 and the yoke 13 via the pin 17a, the oscillation of the armature 14 and the yoke 13 can be prevented and the generation of a noise caused by the oscillation can be prevented.

In those circumstances, because the armature 14 is integrally connected to the yoke 13 as an assembly by connecting the armature 14 to the yoke 13 via the connecting pin 17a in a state where the armature 14 is restricted from rotating and prevented from falling out (displacing), the actuator assembly 10c can be assembled to the case which covers the clutch mechanism 10b via the yoke 13. With the foregoing assembling structure, the readiness for assembling the actuator assembly 10c relative to the clutch mechanism 10b serving as the member to be actuated can be improved.

According to the electromagnetic actuator 10a of the electromagnetic clutch A, the connecting pin 17a which connects the armature 14 to the yoke 13 is made of non-magnetic material and the operating piston 16 which transmits the moving force of the armature 14 to the clutch mechanism 10b as the actuating force is made of non-magnetic material. Thus, flux leakage from the circulating magnetic path L formed between the yoke 13 and the armature 14 can be prevented to maintain the magnetic path L to be stable, which accordingly stabilizes the actuating force applied to the clutch mechanism 10b.

According to the electromagnetic actuator 10a of the electromagnetic clutch A, the air gap between the yoke 13 and the armature 14 is adjusted by a thickness of the spacer 17c provided between the armature 14 and the operating piston 16. Thus, by selecting and providing the spacer 17c having an appropriate thickness between the armature 14 and the operating piston 16, an appropriate dimension of air gap can be set irrespective of machining error and assembling error of components, and thus the actuating force at the initial stage can be stabilized.

Figure 2:
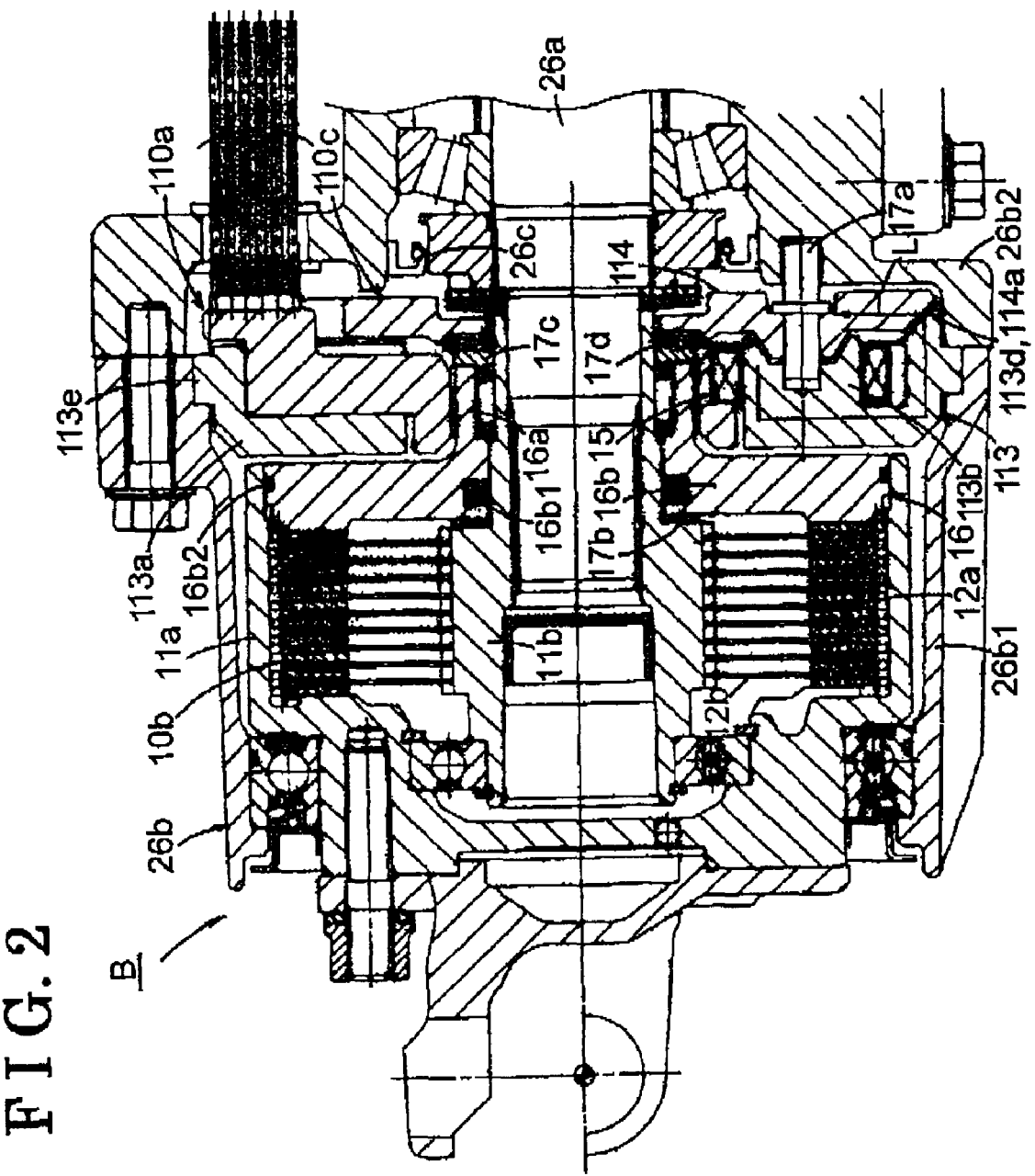
FIG. 2 is a cross-sectional view of a first driving force transmitting apparatus for a vehicle according to the embodiment of the present invention.
Figure 3:
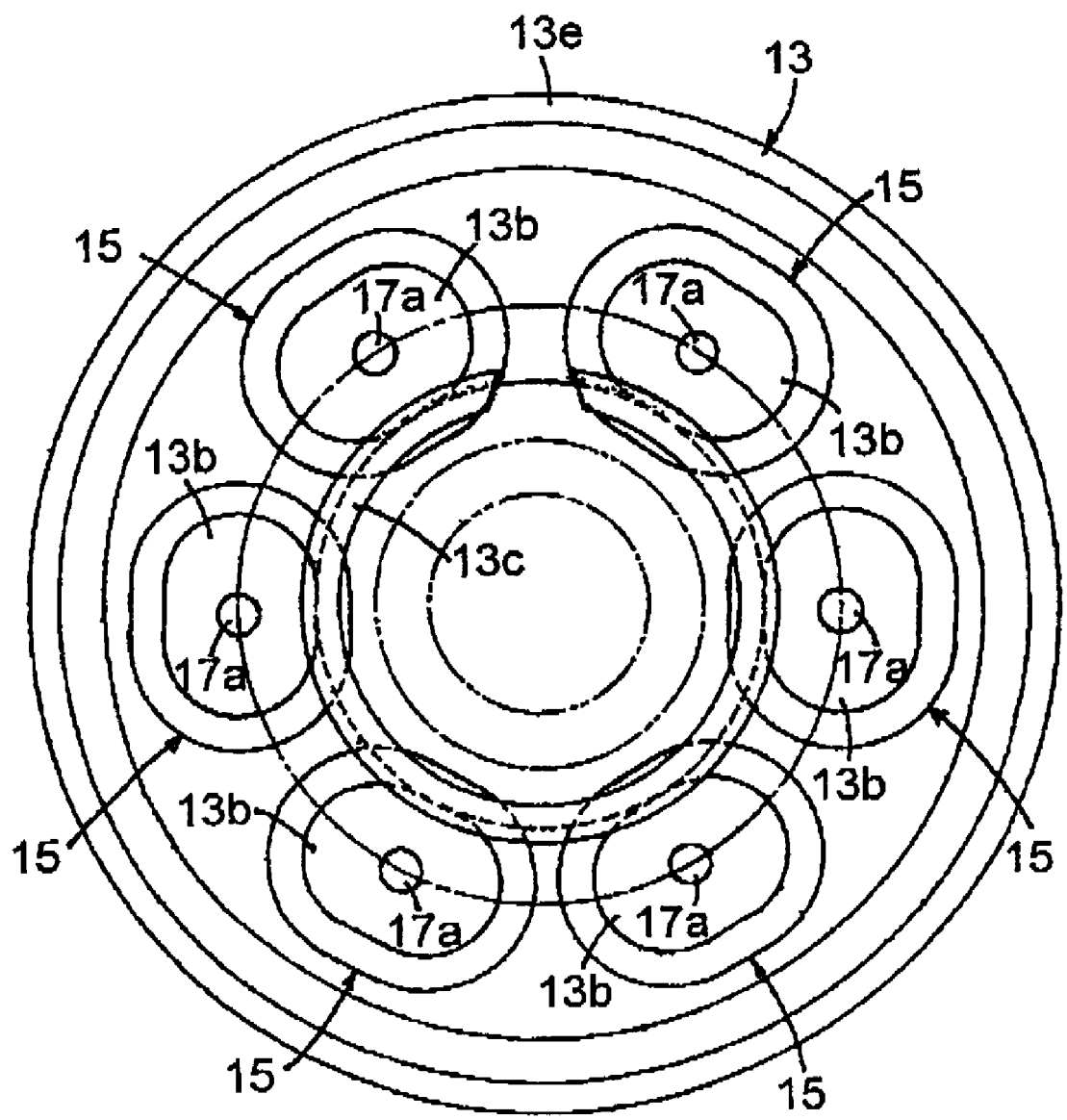
FIG. 3 is a front view schematically showing a side of a yoke provided at the first driving force transmitting apparatus according to the embodiment of the present invention.
Figure 4:
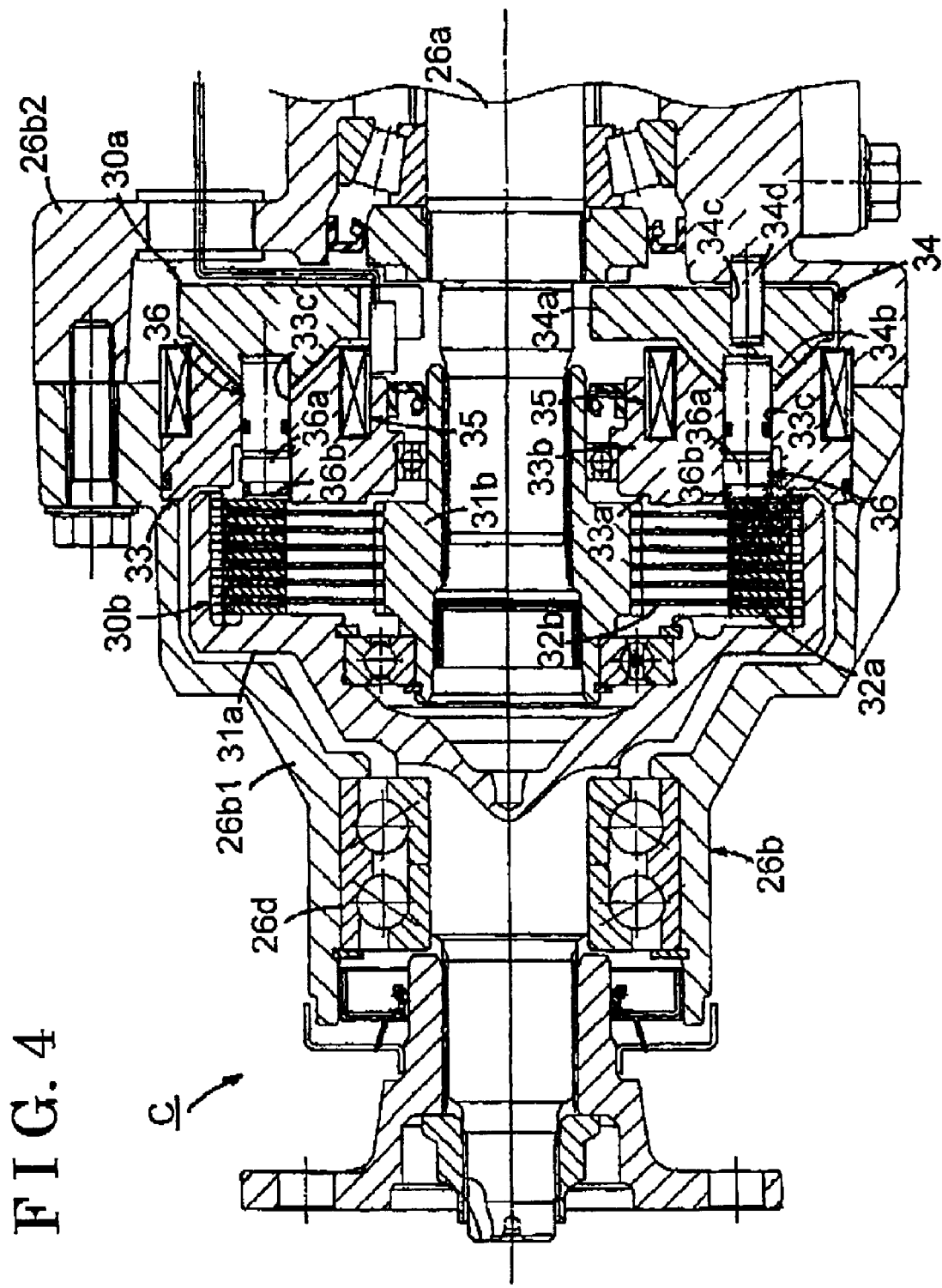
FIG. 4 is a cross-sectional view showing a second driving force transmitting apparatus according to the embodiment of the present invention.
Figure 5:
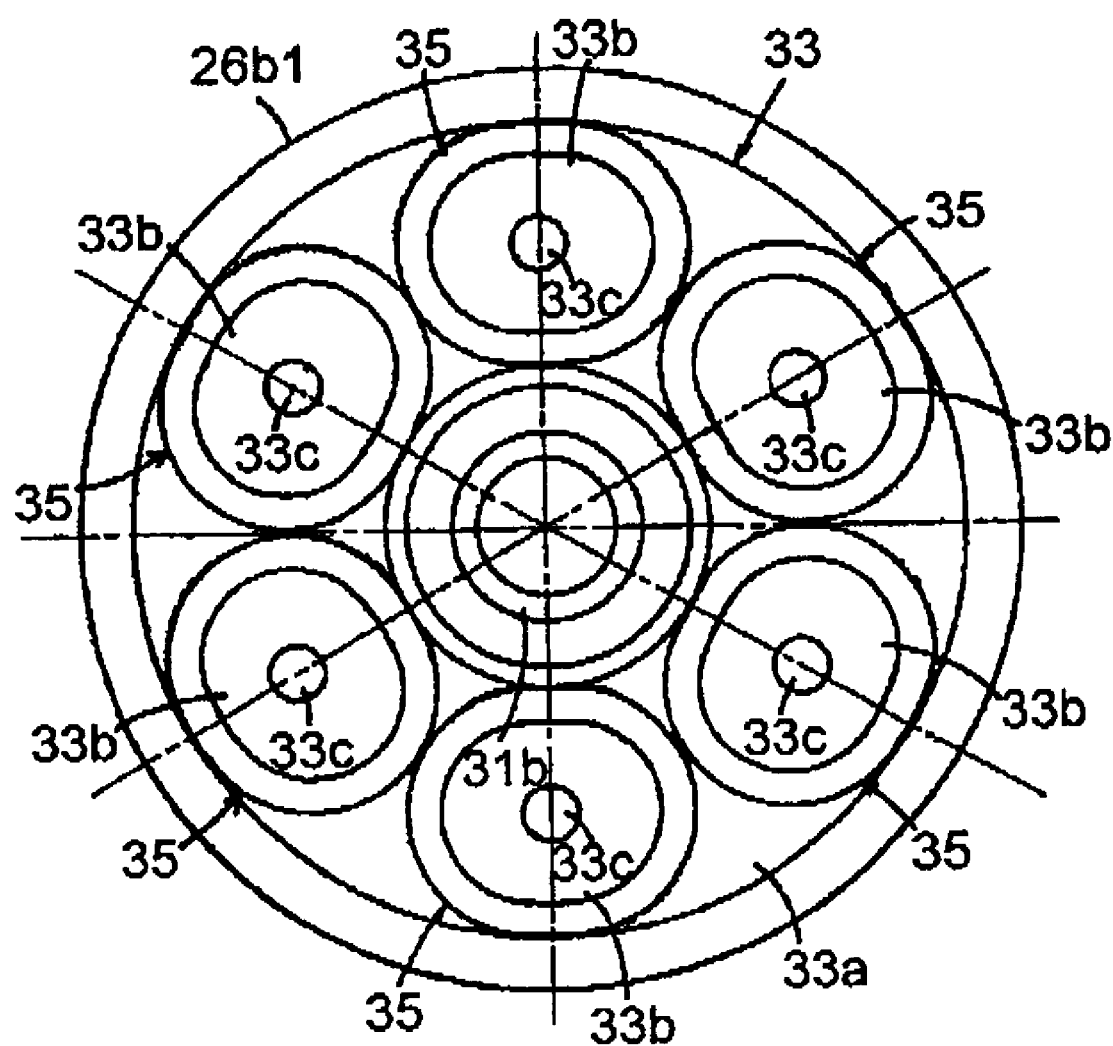
FIG. 5 is a front view schematically showing a side of a yoke provided at the second driving force transmitting apparatus according to the embodiment of the present invention.
Figure 7:
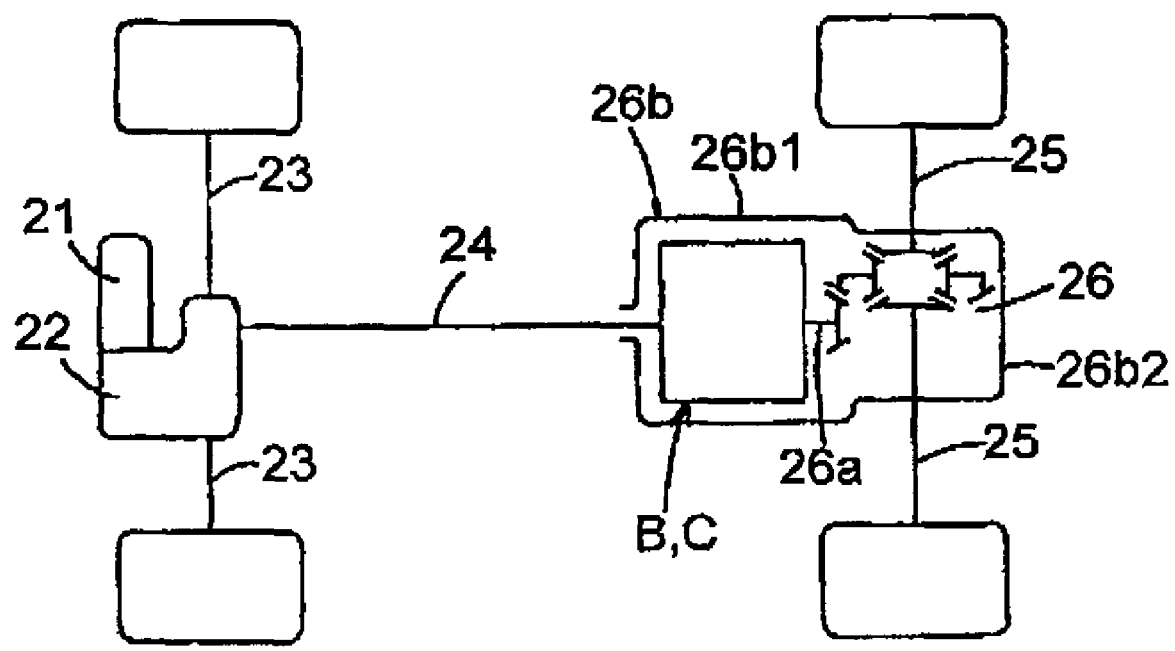
FIG. 7 is a schematic view showing a front wheel and/or rear wheel driving vehicle having the driving force transmitting apparatus arranged on a driving system path of a vehicle.

A driving force transmitting apparatus for a vehicle according to the embodiment of the present invention includes the electromagnetic clutch according to the embodiment of the present invention. FIGS. 2 and 3 show a first driving force transmitting apparatus B which includes a first electromagnetic clutch. FIGS. 4 and 5 show a second driving force transmitting apparatus C which includes a second electromagnetic clutch. As shown in FIG. 7, each of the driving force transmitting apparatuses B, C is provided between a driveshaft and a rear differential of the vehicle to form a front wheel and/or rear wheel driving vehicle. The front wheel and/or rear wheel driving vehicle includes an engine 21, a transfer 22, a pair of drive shafts 23 for front wheels to which drive power distributed by the transfer 22 is outputted, a propeller shaft 24 serving as a driving shaft to which drive power distributed by the transfer 22 is outputted, and a rear differential 26 which distributes the drive power inputted from the propeller shaft 24 to a pair of drive shafts 25 for rear wheels. Each of the driving force transmitting apparatuses B, C is provided between the propeller shaft 24 and the rear differential 26.

Accordingly, the driving force transmitting apparatuses B, C mounted on a power transmission system of a vehicle intermittently engages and disengages the propeller shaft 24 and an input shaft 26a (i.e., serving as a driven shaft) of the rear differential 26 to transmit and discontinue transmission of torque. When the propeller shaft 24 and the input shaft 26a of the rear differential 26 are connected so as to transmit torque, a four-wheel-drive state in which front wheels and rear wheels drive the vehicle together is constituted. When the propeller shaft 24 and the input shaft 26a of the rear differential 26 are disconnected so as not to transmit torque, a two-wheel-drive state in which the front wheels drive the vehicle is constituted.

The first driving force transmitting apparatus B has basically the same structure with the electromagnetic clutch A serving as the first electromagnetic clutch. The driving force transmitting apparatus B includes an electromagnetic actuator 110a and the clutch mechanism 10b and is housed in a case 26b of the differential 26 in a state connecting to the differential 26.

The first driving force transmitting apparatus B includes an outer housing 11a serving as an outer rotation member, an inner shaft 11b serving as an inner rotation member, the electromagnetic actuator 110a assembled onto an outer periphery of the inner shaft 11b, and a clutch mechanism 10b housed in a clutch housing formed by the outer housing 11a, the inner shaft 11b, and the electromagnetic actuator 110a. The inner shaft 11b is positioned coaxially to and in the outer housing 11a in a state where the inner shaft 11b penetrates through the central portion of the actuator 10a to be liquid tight and rotatable. The inner shaft 11b is rotatably supported in the outer housing 11a in the foregoing manner.

The clutch mechanism 10b is a wet multiple disc type clutch mechanism which includes plural outer clutch plates 12a and plural inner clutch plates 12b. Each outer periphery of the outer clutch plates 12a is fitted to a spline formed on an inner periphery of the outer housing 11a to be assembled so as to move in an axial direction. The inner clutch plates 12b are arranged alternately to the outer clutch plates 12a, and each inner periphery of the inner clutch plates 12b is fitted to a spline formed on an outer periphery of the inner shaft 11b to be assembled so as to move in the axial direction.

The electromagnetic actuator 110a, likewise the electromagnetic clutch A, includes a yoke 113 which supports an electromagnetic coil, an armature 114, electromagnetic coils 15 (e.g., six electromagnetic coils) circularly arranged on the yoke 13, and an operating piston 16. The yoke 113 is shaped in a thick disc form having a circular hole at the central portion thereof. As shown in FIG. 3, ellipse protrusions 113b (e.g., six protrusions) are formed at a first side of a yoke body 113a. The protrusions 113b are circularly arranged with even intervals and the electromagnetic coils 15 are fitted to the corresponding protrusions 113b respectively to be assembled. Each of the electromagnetic coils 15 is an elliptical cylinder around which a wire is wound a predetermined number of times and is assembled to the yoke body 113a via a circlip 13c while fitting to each protrusion 113b of the yoke body 113a.

The armature 114 of the electromagnetic actuator 110a is thinner than the yoke 113 and is shaped in a disc form having a circular hole in the center thereof. The armature 114 is assembled to the yoke 113 via a connecting pin 17a for assembling and is positioned facing a first side of the yoke 113 to move forward and backward. A tip end of a leg portion of each connecting pin 17a is press fitted to a pressing hole formed at approximately central portion of each protrusion 113b of the yoke 113 in a state where the connecting pin 17a penetrates through an assembling hole provided at the armature 114.

Accordingly, the connecting pin 17a supports the armature 114 not to fall out (not to be displaced) and to move forward and backward relative to the yoke 113. The connecting pin 17a constructs an assembly 110c in which the yoke 113 and the armature 114 are integrally assembled. The assembly 110c is fitted onto the inner shaft 11b so as to rotate. The assembly 110c is referred to as an actuator assembly 110c hereinafter. In the actuator assembly 110c, opposing surfaces 113d, 114a formed at respective peripheral ends of the yoke body 113a and the armature 114 where the yoke body 113a and the armature 114 face each other are tapered. A clearance between the opposing surfaces 113d, 114a serves as an air gap and also serves as a clearance which determines a moving distance of the armature 114, in other words, a stroke rate of the operating piston 16.

The operating piston 16 of the electromagnetic actuator 10a includes a cylindrical body 16a and a disc shaped pressing body 16b having a larger diameter than the cylindrical body 16a and integrally formed with an end of the cylindrical body 16a. Before assembling the actuator assembly 110c which includes the yoke 113, the armature 114, and the electromagnetic coil 15 integrally formed together, onto the inner shaft 11b, the operating piston 16 is assembled onto an outer periphery of the inner shaft 11a to be liquid tight and rotatable in a state where the operating piston 16 is outfitted on an outer periphery of the inner shaft 11b from a first side. In those circumstances, the operating piston 16 is assembled to the outer housing 11a at an inside of a first end of an opening portion thereof to be liquid tight and rotatable.

In the foregoing assembled state, the operating piston 16 forms a clutch housing together with the outer housing 11a and the inner shaft 11b and the operating piston 16 faces a stepped portion of the inner shaft 11b via a spring 17b. The spring 17b retains the disc shaped pressing body 16b of the operating piston 16 and a first side of a clutch plate of the clutch mechanism 10b to have a predetermined distance from each other, and, consequently, the spring 17b retains the plural clutch plates 12a, 12b of the clutch mechanism 10b to have a predetermined dimension of clearance from one another.

The actuator assembly 110c of the electromagnetic actuator 10a is positioned at a first end of the inner shaft 11b at a rear end side of the cylindrical body 16a of the operating piston 16 assembled in the foregoing manner via a spacer 17c and a needle bearing 17d. An outer periphery 113e of the yoke 113 fits into an opening of a front side case portion 26b1 of a case 26b of a differential 26 which houses the driving force transmitting apparatus B, and, thus the actuator assembling body 110c is assembled to the case portion 26b by attaching a rear side case portion 26b2 of the case 26b to the front side case portion 26b1. Accordingly, the actuator assembly 110c prevents the operating piston 16 from falling out (displacing) and the spacer 17c maintains a clearance between the yoke 113 and the armature 114, that is an air gap of the electromagnetic actuator, to be a predetermined dimension.

The driving force transmitting apparatus B which includes the electromagnetic actuator 110a and the clutch mechanism 10b serving as the member to be actuated is housed in the front side case portion 26b1 of the case 26b of the differential 26 and is supported by the front side case portion 26b1 at a front end side boss portion of the outer housing 11a so as to be liquid tight and rotatable. The boss portion at the tip end side of the outer housing 11a is connected to a rear end portion of the propeller shaft 24 so as to transmit torque. A tip end of an input shaft 26a of the differential 26 is positioned in the inner shaft 11b so that the input shaft 26a connects to the inner shaft 11b to transmit torque. In a state where the driving force transmitting apparatus B is housed in the case 26b of the differential 26, an inside of the front side case portion 26b1 and an inside of the rear side case portion 26b2 are defined to be liquid tight by a sealing member 26c which is provided between an internal periphery surface of the rear case portion 26b2 and an outer periphery surface of the input shaft 26a. Also, in the state where the driving force transmitting apparatus B is housed in the case 26b of the differential 26, a space in which the electromagnetic actuator 110a is provided and an inside of the clutch housing are defined to be liquid tight by a sealing member 16b1 provided at an inner periphery of the disc shaped pressing body 16b of the operating piston 16 and by a sealing member 16b2 provided at an outer periphery of the disc shaped pressing body 16b of the operating piston 16.

Accordingly, with the driving force transmitting apparatus B which is provided between the propeller shaft 24 and the input shaft 26a of the differential 26, by applying electric current with a predetermined electric voltage to each of the electromagnetic coils 15 of the actuator assembly 110c, the clutch mechanism 10b is operated to engage so that the outer housing 11a and the inner shaft 11b are connected to transmit the torque. In those circumstances, torque inputted from the propeller shaft 24 to the outer housing 11a can be outputted to the inner shaft 11b via the clutch mechanism 10b, and, thus is outputted to the input shaft 26a of the differential 26 via the inner shaft 11b. Consequently, the driving force transmitting apparatus B constitutes a four-wheel-drive state where front wheels and rear wheels drive the vehicle simultaneously.

According to the driving force transmitting apparatus B, likewise the electromagnetic clutch A, when the electric current is applied to each of the electromagnetic coils 15 of the electromagnetic actuator 110a, as shown with a solid line in FIG. 2, a magnetic path L, which circulates between the yoke 13 and the armature 14, is formed at portions where each of the electromagnetic coils 15 is provided. The magnetic force deriving from the magnetic path formed at the portions provided at each of the electromagnetic coils 15 is integrated to affect the armature 14 as an attraction force which attracts the armature 14. Consequently, the armature 14 moves towards the yoke 13 to push the operating piston 16 with the force corresponding to the attraction force, and the operating piston 16 equally pushes the all clutch plates 12a, 12b of the clutch mechanism 10b via the spring 17b.

Accordingly, the clutch mechanism 10b engages to connect the outer housing 11a and the inner shaft 11b so as to transmit the torque. When the clutch mechanism 10b is connected in the foregoing manner, torque inputted from the propeller shaft 24 to the outer housing 11a is transmitted from the inner shaft 11b to the input shaft 26a of the differential 26, and, thus is transmitted to drive shafts of the rear wheels via the differential 26. In those circumstances, the electric current applied to each of the electromagnetic coils 15 is adjusted in response to a vehicle traveling state such as vehicle speed and/or rotation speed difference between front wheels and rear wheels.

According to the driving force transmitting apparatus B, when the application of the electric current to each of the electromagnetic coils 15 is stopped, the magnetic path L formed at each of the electromagnetic coils 15 is lost so that the attraction force relative to the armature 114 is lost. Consequently, the force of the armature 114 to push the operating piston 16 is lost, the operating piston 16 returns to an initial setting position by a biasing force of the spring 17b, and simultaneously, the operating piston 16 returns the armature 114 to an initial setting position. Accordingly, in the driving force transmitting apparatus B, the engagement of the clutch mechanism 10b is released to constitute a two-wheel-drive state where only front wheels drive the vehicle.

According to the driving force transmitting apparatus B, the clutch mechanism 10b is operated (engaged) by transmitting the moving force relative to the armature 114 deriving from the magnetic force generated at the electromagnetic actuator 110a to the clutch mechanism 10b serving as the member to be actuated as the actuating force via the operating piston 16. With the construction of the driving force transmitting apparatus B, the electromagnetic actuator 110a is provided with the plural (e.g., six) electromagnetic coils 15 circularly arranged thereon with even intervals and forms the magnetic path L at the portions at which each of the electromagnetic coils 15 is provided. Accordingly, the magnetic force deriving from the magnetic path L formed at each of the electromagnetic coils 15 integrally affect the armature 14, the armature 14 moves with a large degree of attraction force, and applies the large degree of actuating force to the clutch mechanism 10b.

Accordingly, the driving force transmitting apparatus B effectively functions as an actuator for the clutch mechanism 10b, which needs the large degree of actuating force. With the construction of the driving force transmitting apparatus B, the actuating force increasing means such as the cam mechanism which is essential to the known driving force transmitting apparatus is not necessary, and an size increase and complication of the driving force transmitting apparatus B, in which the electromagnetic actuator 10a and the clutch mechanism 10b are integrally assembled, can be restrained. The driving force transmitting apparatus B achieves the effects of the electromagnetic clutch A explained above and further achieves the following effects because of the construction of the driving force transmitting apparatus B.

First, according to the driving force transmitting apparatus B, the yoke 113 including the electromagnetic coils 15 and the armature 114, which construct the electromagnetic actuator 110a together are integrally constructed as an assembly (i.e., the actuator assembly 10c) via the connecting pin 17a which connect the yoke 113 and the armature 114, and the actuator assembly 110c is assembled to the front side case 26b1 of the case 26b of the differential 26 which houses the driving force transmitting apparatus B. By adopting the foregoing assembling structure, the readiness for assembling the driving force transmitting apparatus B to the case 26b of the differential 26 improves.

Second, according to the driving force transmitting apparatus B, the clutch mechanism 10b is arranged in the clutch housing, the disc shaped pressing body 16b of the operating piston 16 is arranged facing the first end side of the clutch mechanism 10b and fronting onto the clutch housing, and the spring 17b is provided between the operational piston 16 and the inner shaft 11b to appropriately ensure the clearances between the clutch plates 12a and 12b of the clutch mechanism 10b. By adopting the foregoing construction, even when a difference of the rotation speeds is generated between the outer housing 11a and the inner shaft 11b because of the large degree of the rotation speed difference generated between the front wheels and the rear wheels of the vehicle, the clutch mechanism 10b can be adequately protected. Further, with the foregoing construction, the drag torque deriving from the residual magnetism at the electromagnetic actuator 110a can be reduced even when the residual magnetism exists.

Third, according to the driving force transmitting apparatus B, the inside of the clutch housing which houses the clutch mechanism 10b, the space which houses the electromagnetic actuator 110a, and the inside of the rear case portion 26b2 of the case 26b of the differential 26 are defined to be liquid tight by the sealing members 16b1, 16b2, 26c respectively. By adopting the foregoing construction, because each of the space portions can be filled with operation fluid or other protective medium which has properties appropriate for protecting each mechanism, or the like, housed therein, the durability of each mechanism can be improved.

Fourth, according to the driving force transmitting apparatus B, when adopting the electromagnetic actuator 110a including six electromagnetic coils 15 to operate the driving force transmitting apparatus B, for example, electric current can be applied to a half number of the six electromagnetic coils 15 (i.e., three electromagnetic coils 15) which are positioned with equal intervals. By adopting the arrangement of the electromagnetic coil 15 in the foregoing manner, by switching the number of the actuated electromagnetic coils 15, variations of the transmission torque required between the outer housing 11a and the inner shaft 11b, that is, between the propeller shaft 24 and the differential 26, because of variations of control electric current can be reduced. Further, in those circumstances, because the electromotive force is generated by changes of magnetic fluxes leaked to the electromagnetic coil 15, the electric current generated by the electromotive force can be detected by an electric current sensor, and because a dimension of the air gap can be estimated by the detected value of the electric current, the detected value of the electric current can be used as a means for inspection and maintenance of the driving force transmitting apparatus B.

Fifth, according to the driving force transmitting apparatus B, the opposing surfaces 113d, 114a, formed at the periphery portion of the yoke body 113a and the armature 114 respectively, and arranged to face each other of the actuator assembly 110c, are tapered. The clearance between the opposing surfaces 113d and 114a serves as the air gap and also as a clearance to determine a moving distance of the armature 114, that is, to determine a stroke rate of the operating piston 16. By adopting the foregoing construction, the stroke rate of the operating piston 16 can be increased without increasing the length of the magnetic path and large degree of the actuating force can be appropriately applied to the clutch mechanism 10b of the operating piston 16.

On the other hand, a second driving force transmitting apparatus C according to the embodiment of the present invention basically adopts a second electromagnetic clutch according to the embodiment of the present invention. The driving force transmitting apparatus C includes an electromagnetic actuator 30 and a clutch mechanism 30b serving as a member to be actuated. The driving force transmitting apparatus C is housed in a case 26b of a differential 26 while connected to the differential 26.

The second driving force transmitting apparatus C includes an outer housing 31a serving as an outer rotation member, an inner shaft 31b serving as an inner rotation member, an electromagnetic actuator 30a assembled onto an outer periphery of the inner shaft 31b, and the clutch mechanism 30b which is housed in a clutch housing formed by the outer housing 31a, the inner shaft 31b, and the electromagnetic actuator 30a. The inner shaft 31b penetrates through a central portion of the electromagnetic actuator 30a to be liquid tight and rotatable and is positioned in the outer housing 31a coaxially thereto. In the foregoing state, the inner shaft 31b is supported in the outer housing 31a so as to rotate.

The clutch mechanism 30b is a wet type multiple plates clutch mechanism including plural outer clutch plates 32a and plural inner clutch plates 32b. An outer periphery of each of the outer clutch plates 32a is fitted to a spline formed on an inner periphery of the outer housing 31a to be assembled so as to move in an axial direction Each of the inner clutch plates 32b and each of the outer clutch plates 32a are arranged alternately. An inner periphery of each of the inner clutch plates 32b is fitted to a spline formed on an outer periphery of the inner shaft to be assembled so as to move in an axial direction.

The electromagnetic actuator 30a includes a yoke 33 supporting electromagnetic coils 35, an armature 34, the electromagnetic coils 35 (e.g., six electromagnetic coils 35) circularly arranged on the yoke 33, and rod shaped operating pistons 36 (e.g., six pistons 36).

The yoke 33 is shaped in a thick disc form having a circular hole in the center thereof. As shown in FIG. 5, elliptical protrusions 33b (e.g., six elliptical protrusions 33b) are formed at a first side of a yoke body 33a. Each of the protrusions 33b is circularly positioned on the yoke body 33a with equal intervals, and the electromagnetic coils 35 are fitted to the corresponding protrusions 33b respectively to be assembled. Each of the electromagnetic coils 35 is an elliptical cylinder around which a wire is wound a predetermined number of times, and is assembled to the yoke body 33a while fitting to the protrusion 33b of the yoke body 33a. Each of the electromagnetic coils 35 assembled to the yoke body 33a is arranged so that adjacent electromagnetic coils 35 have magnetic properties in opposite directions from one another.

In a state where each of the magnetic coils 35 is assembled to the yoke body 33a, each of the electromagnetic coils 35 is integrally fixed to the yoke body 33a and is positioned at mating surfaces between the front side case portion 26b1 and the rear side case portion 26b2 of the case 26b of the differential 26 which houses the driving force transmitting apparatus C. In those circumstances, the electromagnetic coils 35 are fixed by the rear side case portion 26b2. A front end portion of the front side case portion 26b1 is supported by a double row angular ball bearing 26d on a shaft portion positioned at front side of the outer housing 31a while covering the shaft portion positioned at front side of the outer housing 31a.

Each protrusion 33b of the yoke body 33a is formed with a cone shaped recess which opens to the rear side and with a through hole 33c which is coaxial to the cone shaped recess portion. Each operating piston 36 is positioned in each through hole 33c so as to slide in an axial direction and so as to be liquid tight. The operating piston 36 is a rod shaped actuating force transmitting member. A washer 36a and a needle bearing 36b are provided at a front end side of each of the operating pistons 36. The needle bearing 36b is positioned facing the outer clutch plate 32a of the clutch mechanism 30b so as to be slidable on the clutch plate 32a. The needle bearing 36b and the washer 36a are positioned in oil in the clutch housing in the foregoing state.

The armature 34 of the electromagnetic actuator 30a includes a protrusion 34b shaped in a cone form in cross section and facing a recess portion, shaped in a cone form in cross section, of the yoke 33 and formed at a front side of an armature body 34a which is thinner than the yoke 33. An assembling hole 34c which is coaxial to the through hole 33c is formed at each of the protrusions 34b. Each of the operating pistons 36 is positioned through each of the through holes 33c of the yoke 33 while fitted to corresponding assembling hole 34c of the armature 34. In the foregoing state, the armature 34 is assembled to the rear side case portion 26b2 of the case 26b of the differential 26 via plural connecting pins 34d so as to be movable in a forward and backward direction relative to the yoke 33. According to the electromagnetic actuator 30a, a clearance between the tapered opposing surfaces of the yoke 33a and the armature 34 which face each other serves as the air gap and as a clearance which determines a moving distance of the armature 34, that is, a stroke rate of the operating piston 16.

The second driving force transmitting apparatus C which includes the electromagnetic actuator 30a and the clutch mechanism 30b serving as the member to be actuated is liquid tight and rotatably supported by the front side case portion 26b1 at the tip end side shaft portion of the outer housing 31a via the double row angular ball bearing 26c while being housed in the front side case portion 26b1 of the case 26b of the differential 26. A rear end portion of the propeller shaft 24 is connected to the tip end side shaft portion of the outer housing 31a to transmit torque. And a tip end of the input shaft 26a of the differential 26 is positioned in the inner shaft 31b and is connected to the inner shaft 31b so that the input shaft 26a transmits the torque to the inner shaft 11b.

Accordingly, with the construction of the driving force transmitting apparatus C provided between the propeller shaft 24 and the input shaft 26a of the differential 26, by applying electric current with a predetermined voltage to each of the electromagnetic coils 35 of the electromagnetic actuator 30a, the clutch mechanism 30b is operated to engage so that the outer housing 31a and the inner shaft 31b are connected to transmit the torque. Further, the torque inputted from the propeller shaft 24 to the outer housing 31a can be outputted to the inner shaft 31b via the clutch mechanism 30b, and thus can be outputted to the input shaft 26a of the differential 26 via the inner shaft 31b. Consequently, the driving force transmitting apparatus C constitutes a four-wheel drive state where front wheels and rear wheels simultaneously drive the vehicle.

According to the driving force transmitting apparatus C, when the electric current is applied to each of the electromagnetic coils 35 of the electromagnetic actuator 30a, a magnetic path which circulates between the yoke 33 and the armature 34 is formed at a portion provided with each of the electromagnetic coils 35. The magnetic force deriving from the magnetic path formed at the portions provided with the electromagnetic coils 35 is integrated to affect the armature 34 as attraction force which attracts the armature 34. Consequently, the armature 34 moves towards the yoke 33 to push the operating pistons 36 with the force corresponding to the attraction force. The operating pistons 36 push all the clutch plates 32a, 32b of the clutch mechanism 30b equally via the washers 36a and the needle bearings 36b.

Accordingly, the clutch mechanism 30b is engaged to connect the outer housing 31a and the inner shaft 31b so as to transmit the torque. When the clutch mechanism 30b is connected as foregoing, torque inputted from the propeller shaft 24 to the outer housing 31a is transmitted from the inner shaft 31b to the input shaft 26a of the differential 26, and is transmitted to each drive shaft of the rear wheels via the differential 26. In those circumstances, the electric current applied to the electromagnetic coils 35 is adjusted in response to a vehicle traveling state such as vehicle speed and/or rotation speed difference between front wheels and rear wheels.

According to the driving force transmitting apparatus C, when the application of the electric current to the electromagnetic coil 35 is stopped, the magnetic paths formed by the electromagnetic coils 35 are lost and thus the attraction force relative to the armature 34 is lost. Consequently, the force of the armature 34 to push the operating piston 36 is lost, and the operating piston 36 returns to an initial portion due to hydraulic pressure in the clutch housing, and simultaneously, the armature 34 returns to an initial position. Accordingly, the engagement of the clutch mechanism 30b is released, and the driving force transmitting apparatus C constitutes a two-wheel drive state where only the front wheels drive the vehicle.

With the construction of the driving force transmitting apparatus C, a moving force deriving from the magnetic force generated at the electromagnetic actuator 30a and applied to the armature 34 is transmitted to the clutch mechanism 30b serving as the member to be actuated as the actuating force via the operating piston 36 to operate (engage) the clutch mechanism 30b. The electromagnetic actuator 30a is provided with even number (e.g., six) of electromagnetic coils 35 circularly arranged thereon with even intervals, and each of the electromagnetic coils 35 are arranged so that each of the electromagnetic coils 35 have magnetic field which is in an opposite direction from adjacent electromagnetic coils 35 one another. Thus, according to the driving force transmitting apparatus C, compared to the first driving force transmitting apparatus B, integrated electromotive force generated by the electromagnetic coils 35 can be further enhanced.

According to the driving force transmitting apparatus C, each operating piston 36 shaped in the rod form is positioned in the corresponding through hole 33c, formed on the yoke 33 and extending in an axial direction, to be liquid tight and slidably in the axial direction. In those circumstances, the operating pistons 36 face the first side of the clutch mechanism 30b. With the foregoing construction of the driving force transmitting apparatus C, because the operating pistons 36 can be downsized and can be assembled to the yoke 33 without increasing the yoke 33 in size, the second driving force transmitting apparatus C can be downsized compared to the first driving force transmitting apparatus B.

According to the driving force transmitting apparatus C, because the needle bearings 36b and the washers 36a provided between respective tip ends of the operating pistons 36 and the first side of the clutch mechanism 30b front onto the inside of the clutch housing, the needle bearings 36b and the washers 36a can be positioned in the oil in the clutch housing. Further, according to the driving force transmitting apparatus C, because the double row angular ball bearing 26d is adopted as the front side bearing which supports the tip end portion of the case 26*b* which houses the driving force transmitting apparatus C, the durability of the front side bearing can be improved and the rear side needle bearings can be omitted. Further, according to the driving force transmitting apparatus C, the integrally assembled electromagnetic coils 35 and the yoke 33 of the electromagnetic actuator 30*a* are fixed at mating surfaces between the front side case portion 26*b*1 and the rear side case portion 26*b*2 of the case 26 which houses the driving force transmitting apparatus C. In those circumstances, the electromagnetic coils and the yoke 33 are fixed by the rear side case portion 26*b*2. Accordingly, a snap ring for fixing the electromagnetic coils 35 to the yoke 33 can be omitted.

Figure 6:
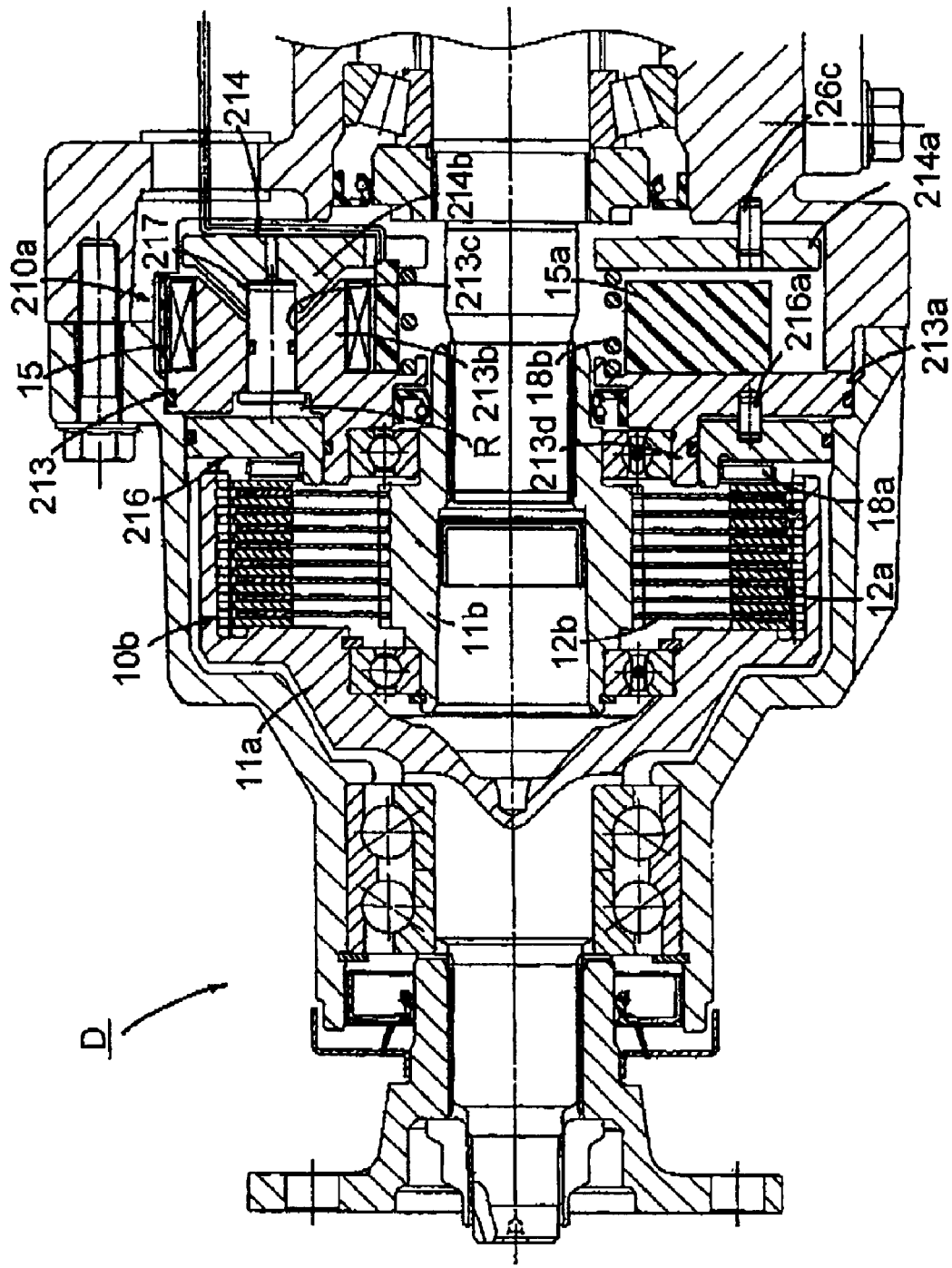
FIG. 6 is a cross-sectional view showing another driving force transmission apparatus including an electromagnetic clutch according to the embodiment of the present invention.

As a variation of the second driving force transmitting apparatus C, a construction of a driving force transmitting apparatus D for a vehicle will be explained with reference to FIG. 6. The arrangement of the electromagnetic coils 15 of the driving force transmitting apparatus D for the vehicle is the same with the arrangement of the second driving force transmitting apparatus C shown in FIG. 5. As shown in FIG. 6, the driving force transmitting apparatus D for the vehicle includes an electromagnetic actuator 210*a* including a yoke 213 supporting the electromagnetic coil, an armature 214, the electromagnetic coils (e.g., six electromagnetic coils) 15 circularly arranged on the yoke 213, and an actuating force transmitting member 216. The yoke 213 is shaped in a thick disc form having a circular hole in the center thereof and includes elliptical protrusions (e.g., six protrusions) 213*b* at a first side of a yoke body 213*a*. A through hole 213*c* is formed on each of the protrusions 213*b*. Each of the through holes 213*c* is shaped to have a large diameter portion at an end thereof. The protrusions 213*b* of the yoke 213 is circularly positioned on the yoke body 213*a* having equal intervals to be fitted to the respective electromagnetic coils 15 and assembled thereto. Each of the electromagnetic coils 15 is cylindrically shaped having an elliptic shape in a cross section and is formed by winding a wire around a magnetic body. Each of the electromagnetic coils 15 is fitted to the corresponding protrusions 213*b* of the yoke 213 and an outer periphery of each of the electromagnetic coils 15 is covered with a resin 15*a*.

The armature 214 of the electromagnetic actuator 210*a* is shaped in a disc thinner than the yoke 213 and having a circular hole in the center thereof. Protrusions (e.g., six protrusions) 214*b* which face corresponding protrusions 213*b* of the yoke 213 respectively are formed on a front surface side of the armature body 214*a*. Each of the protrusions 214*b* is shaped approximately in a cone form which faces a rear side opening portion of each of the protrusions 213*b* of the yoke 13. In a state where the protrusion 214*b* is movably supported by a support pin 26*c* which is arranged protruding from a rear case portion 26*b*2, the protrusion 214*b* moves forward and backward while being fitted to the rear end opening portion of the protrusion 213*b* of the yoke 213. A rear end portion of a connecting pin 217 positioned in each of the through holes 213*c* of the respective protrusions 213*b* is fitted to be fixed to each of the protrusion 214*b* of the electromagnetic actuator 214.

Each of the connecting pins 217 is shaped in a cylindrical form having a plate shaped larger diameter portion. Each of the connecting pins 217 is positioned in the through hole 213*c* of each of the protrusions 213*b* of the yoke 213 and is fitted to a fitting hole formed at an apex of each of the protrusions 214*b* of the armature 214 and fixed thereto. Each of the connecting pins 217 is slidable in each of the through holes 213*c* in an axial direction to be liquid tight. When the armature 214 moves forward or backward relative to the yoke 213, each of the connecting pins 217 moves forward or backward in each of the through holes 213*c*. The connecting pin 217 serves as a first piston of a hydraulic pressure type actuating force boosting mechanism. Thus, for the explanatory purpose, regarding the hydraulic pressure type actuating force boosting mechanism, the connecting pin 217 is referred to as first piston 217. A tip end side larger diameter portion of the first piston 217 is positioned in a large diameter portion at a tip end side of each of the through holes 213*c* of the yoke 213, and a retracting rate of the first piston 217 is restricted within a predetermined range.

The actuating force transmitting member 216 of the electromagnetic actuator 210*a* is assembled between an outer periphery of a boss portion 213*d* provided at a front end of the yoke 213 and an inner periphery of the front side case portion 26*b*1 of the case 26 of the differential 26 which house the power transmitting device D to be liquid tight and slidable. The actuating force transmitting member 216 is positioned facing the front end of the yoke 213. In the explanation of the hydraulic pressure type actuating force boosting mechanism, the actuating force transmitting member 216 is referred to as a second piston 216. The second piston 216 forms a fluid chamber R together with the first piston 217 in each of the through holes 213*c* of the yoke 213. Operation fluid is accommodated in the fluid chamber R. The actuating force transmitting member 216 is supported by the yoke 213 via plural pins 216*a* to be movable in a forward and backward direction relative to the yoke 213. According to the construction of the electromagnetic actuator 210*a*, a thrust bearing 18*a* is provided between the actuating force transmitting member 216 and a first side of the clutch mechanism and a return spring 18*b* is provided between the yoke 213 and the actuator 214.

The driving force transmitting apparatus D structured in the foregoing manner is provided between the propeller shaft 24 and the input shaft 26*a* of the differential 26. In the driving force transmitting apparatus D, by applying the electric current with a predetermined voltage to each of the electromagnetic coils 15 of the electromagnetic actuator 210*a*, the clutch mechanism 10*b* is operated to engage so as to connect the outer housing 11*a* and the inner shaft 11*b* to transmit the torque. Thereafter, the torque inputted to the outer housing 11*a* from the propeller shaft 24 is outputted to the inner shaft 11*b* via the clutch mechanism 10*b* and thus to the input shaft 26*a* of the differential 26. Consequently, the driving force transmitting apparatus D is configured to constitute a four-wheel drive state where front wheels and rear wheels drive simultaneously.

According to the driving force transmitting apparatus D, when the electric current is applied to each of the electromagnetic coils 15 of the electromagnetic actuator 210*a*, a magnetic path which circulates between the yoke 213 and the armature 214 is formed at a position provided with each of the electromagnetic coils 15. The magnetic force deriving from the magnetic path formed at the portion provided with each of the electromagnetic coils 15 is integrated to be applied to the armature 214 as attraction force attracting the armature 214. Consequently, the armature 214 is attracted to move towards the yoke 213 so that the first piston 217 slides towards the second piston 216 against the pressure of the operation fluid in the fluid chamber R. By applying the pressure to the second piston 216 via the fluid, the first piston 217 enables to apply a greater pressure to the second piston 216 than the level of the pressure that the first piston 217 received from the armature 214. Thus, the first piston 217 applies higher degree of hydraulic pressure to the second pistons 216, the second piston 216 pushes the clutch mechanism 10*b* via the thrust bearing 18a, and the clutch mechanism 10b is engaged in response to the degree of the attraction force which attracts the armature 214.

Accordingly, the clutch mechanism 10b is engaged so as to connect the outer housing 11a and the inner shaft 11b to transmit torque. Upon the engagement of the clutch mechanism 10b as foregoing, torque inputted from the propeller shaft 24 to the outer housing 11a is transmitted from the inner shaft 11b to the input shaft 26a of the differential 26, and is transmitted to each drive shaft 25 at rear wheels via the differential 26. In those circumstances, the electric current applied to the electromagnetic coils 15 is adjusted in response to a vehicle traveling state such as vehicle speed and/or rotation speed difference between front wheels and rear wheels.

According to the driving force transmitting apparatus D, when the application of the electric current to each of the electromagnetic coils 15 is stopped, the magnetic path formed at each of the electromagnetic coils 15 is lost, and thus the attraction force relative to the armature 214 is lost. Consequently, the pushing force for pushing the second piston 216 is lost, and the armature 214 and each of the first pistons 217 integrally formed with the armature 214 return to original positions by the return spring 18b. Accordingly, the engagement of the clutch mechanism 10b is released at the driving force transmitting apparatus D, and the driving force transmitting apparatus D constitutes a two wheel drive state where only front wheels drive the vehicle.

As explained above, according to the driving force transmitting apparatus D, the attraction force deriving from the magnetic force, generated at the electromagnetic actuator 210a and applied to the armature 214, is converted to the operational fluid pressure via each of the first pistons 217 serving as an actuating force boosting mechanism to push the second piston 216 by the operation fluid pressure and thus to engage the clutch mechanism 10b. Accordingly, with the construction of the actuating force boosting mechanism, the operational fluid pressure applied to the clutch mechanism 10b is boosted in accordance with ratio of facing dimensions of each of the first pistons 217 and each of the second pistons 216. The boosted operation fluid pressure, that is, the boosted actuating force of the armature 214 is transmitted to the clutch mechanism 10b. Accordingly, the actuating force boosting mechanism of the driving force transmitting apparatus D effectively serves as a boosting means of the actuating force for the clutch mechanism 10b which needs large degree of the actuating force.

According to the disclosed subject matter of the actuating force boosting mechanism, the actuting force boosting mechanism is structured with the yoke 213, the armature 214, and the actuating force transmitting member 216 which are essential to the construction of the electromagnetic actuator 210a and is included in the electromagnetic actuator 210a. Thus, compared to a known actuating force boosting mechanism which includes a cam mechanism provided additionally to the electromagnetic actuator 210a, the occupying ratio of the actuating force boosting mechanism in the driving force transmitting apparatus for the vehicle according to the disclosed embodiment is smaller. Accordingly, by adopting the actuating force boosting mechanism, the size increase of the driving force transmitting apparatus can be largely restrained, and the weight of the device can be reduced. Further, because boosting ratio of the actuating force boosting mechanism can be determined by a ratio of dimensions of the facing surfaces of the first piston 217 and the second piston 216, the boosting ratio can be readily determined.

With the construction of the electromagnetic actuator of the embodiment of the present invention, because the plural electromagnetic coils are arranged at the supporting member, the integrated electromotive force is enhanced and the magnetic path generated between the supporting member (yoke) and the moving member (armature) adjacent to and facing the supporting member is shortened, the reluctance is reduced, and the magnetic flux density is enhanced. Thus, according to the electromagnetic actuator of the embodiment of the present invention, the attraction force applied to the moving member (armature) is enhanced to increase the attraction effects generated by the actuator per se, and the actuating force applied to the member to be actuated deriving from the attraction effects can be significantly increased compared to the actuating force generated by known electromagnetic actuators.

Accordingly, the electromagnetic actuator effectively functions as an actuator for the member to be actuated which requires large degree of the actuating force, the actuating force increasing means such as the cam mechanism which is essential to the known electromagnetic actuator can be omitted, and the size increase and the complication of the electromagnetic actuator which integrally includes the actuator and the member to be actuated can be significantly restrained. The electromagnetic actuator according to the embodiment of the present invention is extremely effective as the actuator for the member to be actuated which primarily includes the clutch mechanism, and the actuating force generated by the movement of the moving member (armature) to the supporting member (yoke) can be applied to engage the clutch mechanism of the member to be actuated.

With the electromagnetic actuator according to the embodiment of the present invention, at least three electromagnetic coils can be circularly positioned with equal intervals from one another, and thus, the attraction force from the supporting member can be evenly applied to entire surface of the moving member. Further, the moving member can be moved towards the supporting member in a stable attitude without tilting, wobbling, and rotating relative to the supporting member, which generates the stable actuating force.

With the electromagnetic actuator according to the embodiment of the present invention, the electromagnetic coils are supported by the supporting member maintaining intervals from one another in a circumferential direction so that each of the electromagnetic coils can be arranged to have magnetic field which is in the same direction with magnetic fields of the adjacent electromagnetic coils. On the other hand, with the electromagnetic actuator according to the embodiment of the present invention, even number of the electromagnetic coils are supported by the supporting member maintaining intervals from one another in the circumferential direction so that each of the electromagnetic coils can be arranged to have magnetic filed which is in the reverse direction from magnetic fields of the adjacent electromagnetic coils. In the case where the plural electromagnetic coils are adopted so that each of the electromagnetic coils have magnetic field which is in the reverse direction from the magnetic fields of the adjacent electromagnetic coils, the integrated electromotive force by the electromagnetic coils can be further enhanced compared to the case where each of the electromagnetic coils is arranged to have magnetic field which is in the same direction with magnetic fields of the adjacent electromagnetic coils.

With the construction of the electromagnetic actuator according to the embodiment of the present invention, each of the electromagnetic coils can be assembled to the supporting member while fitting to each corresponding protrusion circularly arranged on the supporting member (yoke) with equal intervals from each other and being prevented from falling out (being displaced) by the circlip. Accordingly, the supporting member and each of the electromagnetic coils can be treated as an integral assembly, which improves the readiness for assembling the supporting member and the electromagnetic coils to the member to be actuated.

With the construction of the electromagnetic actuator according to the embodiment of the present invention, the moving member (armature) is configured to be connected to the supporting member (yoke) via the connecting pin so as to move forward and backward by the predetermined rate while the rotation thereof is restricted. Accordingly, the wobble and the rotation of the moving member when moving towards the supporting member can be prevented and the moving member can be moved to the supporting member with the stable attitude, stable actuating force can be generated, and the decline of the durability of the moving member because of the wobble and the rotation can be restrained. Further, by adopting the foregoing connecting structure, the oscillation of the moving member and the supporting member can be prevented and the generation of the noise because the oscillation can be prevented.

In those circumstances, by connecting the moving member (armature) to the supporting member (yoke) via the connecting pin to be able to move forward and backward by a predetermined rate in a state where the rotation of the moving member is restricted and the falling out (displacement) of the moving armature is prevented so that the moving member and the supporting member are integrally assembled as the assembly, the assembly can be assembled to the case which covers the member to be actuated via the supporting member. According to the foregoing construction, the readiness for assembling the electromagnetic actuator relative to the member to be actuated can be improved.

With the construction of the electromagnetic actuator according to the embodiment of the present invention, when the moving member (armature) is connected to the supporting member (yoke) via the connecting pin, it is preferable that the connecting pin and the actuating force transmitting member which transmits the moving force of the moving member to the member to be actuated as the actuating force are made of non-magnetic material. This enables to prevent the leakage of the magnetic flux from the magnetic path formed between the supporting member and the moving member, stability of the magnetic path can be maintained, and stable actuating force can be generated.

With the construction of the electromagnetic actuator according to the embodiment of the present invention, by constructing the moving member (armature) and the supporting member (yoke) as the integral assembly by connecting the moving member to the supporting member via the connecting pin so that the moving member is able to move forward and backward by a predetermined rate in a state where the rotation is restricted and the falling out of the moving member (armature) is prevented, the assembly can be assembled to the case, which covers the member to be actuated, via the supporting member. By adopting the foregoing assembling structure, the readiness for assembling the electromagnetic actuator relative to the member to be actuated can be improved.

With the construction of the electromagnetic actuator according to the embodiment of the present invention, the air gap between the supporting member (yoke) and the moving member (armature) can be adjusted by a thickness of the spacer provided between the moving member and the actuating force transmitting member. By adopting the adjusting means of the air gap, dimension of the air gap can be appropriately determined by adjusting a thickness of the spacer, which stabilizes an initial stage of the generation of the actuating force.

With the construction of the electromagnetic actuator according to the embodiment of the present invention, the dimension of the clearance between the opposing surfaces of the supporting member (yoke) and the moving member (armature), which face each other, defines a moving rate of the moving member relative to the supporting member and the clearance forms a part of the magnetic path by the supporting member and the moving member. With the construction of the electromagnetic actuator according to the embodiment of the present invention, the opposing surfaces of the supporting member and the moving member, which form the clearance, are tapered. Accordingly, the moving rate of the moving member relative to the supporting member can be increased without increasing the length of the magnetic path, and large degree of the actuating force of the actuating force transmitting member can be appropriately applied to the member to be actuated.

The first electromagnetic clutch and the second electromagnetic clutch according to the embodiment of the present invention includes the electromagnetic actuator according to the embodiment of the present invention, and an actuating force increasing mechanism such as a cam mechanism which increases and transmits the actuating force generated by the actuator to the clutch mechanism is not necessary because the large degree of the actuating force can be generated by the electromagnetic actuator per se. Thus, the electromagnetic clutch can be constructed in a simple structure with smaller number of parts, and thus the weight and the size of the electromagnetic clutch can be reduced.

The first driving force transmitting apparatus for the vehicle according to the embodiment of the present invention includes the first electromagnetic clutch according to the embodiment of the present invention, and the second driving force transmitting apparatus for the vehicle according to the embodiment of the present invention includes the second electromagnetic clutch according to the embodiment of the present invention. Thus, the first driving force transmitting apparatus achieves the effects likewise the first electromagnetic clutch and the second driving force transmitting apparatus achieves the effects likewise the second electromagnetic clutch. Accordingly, the first and second driving force transmitting apparatus can be downsized and reduced in weight and the mountability to the vehicle can be improved.

Because the application of the actuating force increasing mechanism is not necessary according to the first and second electromagnetic clutches and the first and second driving force transmitting apparatus for the vehicle, the length of the magnetic path formed at the known electromagnetic clutch in relation to the actuating force increasing mechanism can be shortened. Accordingly, the reluctance of the magnetic path is reduced to increase the magnetic flux density and the actuating force applied to the clutch mechanism can be further increased. Further, because the actuating force increasing mechanism is not applied, the drag torque generated in the actuating force increasing mechanism and the drag torque generated in the electromagnetic actuator integrally formed with the actuating force increasing mechanism, which is increased by the actuating force increasing mechanism, is not to be transmitted to the clutch mechanism.

With the construction of the first driving force transmitting apparatus according to the embodiment of the present invention, by integrally assembling the supporting member (yoke) and the moving member (armature) of the electromagnetic actuator by the connecting pin as an assembly, the assembly can be assembled to the case which houses the driving force transmitting apparatus, and the readiness for assembling the electromagnetic actuator to the case can be improved.

With the construction of the first driving force transmitting apparatus according to the embodiment of the present invention, the clutch mechanism is the multi plates type clutch including the plural inner clutch plates and the outer clutch plates, and each of the inner clutch plates and each of the outer clutch plates are arranged alternately. The clutch mechanism is arranged in the clutch housing formed by the inner rotation member and the outer rotation member and the actuating force transmitting member is arranged facing the first end side of the clutch mechanism and fronting onto the clutch housing, and the spring which ensures the clearance between the clutch plates of the clutch mechanism can be provided between the actuating force transmitting member, and the inner rotation member and the outer rotation member. Accordingly, when the large degree of difference in rotation speed is generated between the inner rotation member and the outer rotation member, the clutch mechanism can be protected, and the drag torque because of the residual magnetism at the electromagnetic actuator can be reduced.

With the construction of the first driving force transmitting apparatus according to the embodiment of the present invention, the sealing members liquid tight seal between the actuating force transmitting member and the clutch housing formed by the inner rotation member and the outer rotation member, between the supporting member which houses the electromagnetic actuator formed by the moving member (armature) and the actuating force transmitting member, and between the electromagnetic actuator and the accommodating portion of the case which houses the driving force transmitting apparatus. Accordingly, the space which houses the clutch mechanism, the space which houses the electromagnetic actuator, and the space which houses other mechanism of the case can be liquid tight divided from one anther. By supplying each of the space portions with operation fluid or other protective medium which has properties appropriate for protecting each mechanism, or the like, housed therein, the durability of each mechanism can be improved.

With the construction of the first driving force transmitting apparatus according to the embodiment of the present invention, because the actuator which includes the plural electromagnetic coils is adopted, when operating the driving force transmitting apparatus, a driving state in which the electric current is applied to a half number of the plural electromagnetic coils can be adopted. For example, when the actuator includes six electromagnetic coils, the electric current is applied to three electromagnetic coils positioned with equal intervals from one another, which is a half of the total number of the electromagnetic coils. With the foregoing construction, by switching the number of the actuated electromagnetic coils, variations of the torque transmission, the torque transmission which is required between the inner rotation member and the outer rotation member, caused by variations of the controlled electric current can be restrained to reduce. Further, in those circumstances, the electromotive force is generated by the change of the magnetic flux which is leaked to the non-driven electromagnetic coils, and the electric current generated by the electromotive force can be detected by an electric current sensor. Because the dimension of the air gap can be estimated on the basis of the detected electric current value, the detected electric current value can be used as means for inspection and maintenance of the driving force transmitting apparatus.

On the other hand, with the construction of the second driving force transmitting apparatus according to the embodiment of the present invention, the plural rod shaped members, which are assembled to the moving member so as to have a distance from each other in a circumferential direction, are positioned penetrating through the supporting member to be liquid tight and to be movable in a forward and backward direction so as to face the first side of the clutch mechanism. The rod shaped members serve as the actuating force transmitting member. Each rod shaped member serving as the actuating force transmitting member is smaller than the actuating force transmitting member adopted in the first driving force transmitting apparatus and is housed in the supporting member. Accordingly, the second driving force transmitting apparatus which adopts the rod shaped members as the actuating force transmitting member can be further downsized compared to the first driving force transmitting apparatus.

With the construction of the second driving force transmitting apparatus according to the embodiment of the present invention, because each needle bearing provided between the tip end of each rod shaped member serving as the actuating force transmitting member and the first side of the clutch mechanism fronting onto the inside of the clutch chamber, the needle bearing can be positioned in the oil in the clutch chamber. Further, according to the second driving force transmitting apparatus of the embodiment of the present invention, the double row angular ball bearing is adopted as the front side bearing which supports the tip end portion of the case which houses the driving force transmitting apparatus on the outer rotation member. Thus, with the driving force transmitting apparatus according to the embodiment of the present invention, the durability of the front side bearing can be improved, and the rear side needle bearing can be omitted. Further, according to the second driving force transmitting apparatus, the electromagnetic coils of the electromagnetic actuator are integrally fixed to the supporting member at the mating surfaces between the front side case portion and the rear side case portion of the case which houses the driving force transmitting apparatus. Accordingly, with the construction of the driving force transmitting apparatus, a snap ring is not required for fixing the electromagnetic coils to the supporting member.

With the construction of the electromagnetic clutch and the driving force transmitting apparatus for the vehicle including the electromagnetic clutch according to the embodiment of the present invention, the actuating force generated at the electromagnetic actuator is applied to the clutch mechanism to engage and to connect the inner rotation member and the outer rotation member to transmit the torque. In those circumstances, because the actuating force is boosted by the hydraulic pressure type actuating force boosting mechanism and transmitted to the clutch mechanism, the clutch mechanism can be appropriately operated.

The hydraulic pressure type actuating force boosting mechanism is structured by the supporting member, the moving member, and the actuating force transmitting member which are essential to construct the electromagnetic actuator and thus included in the electromagnetic actuator. Accordingly, the occupying ratio of the described subject matter of the hydraulic pressure type actuating force boosting mechanism in the driving force transmitting apparatus for the vehicle is smaller than that of a known actuating force boosting mechanism which includes the additionally provided cam mechanism. Thus, by adopting the hydraulic pressure type actuating force boosting mechanism, the size increase of the electromagnetic clutch and the driving force transmitting apparatus for the vehicle can be significantly restrained, and the weight of the device can be reduced. Further, according to the described subject matter of the hydraulic pressure type actuating force boosting mechanism, because the boosting ratio can be determined by the dimension ratio between the facing areas of the first piston and the second piston, the boosting ratio can be readily determined.

Because the electromagnetic clutch and the driving force transmitting apparatus include the hydraulic pressure type actuating force boosting mechanism, even when the air gap between the supporting member and the moving member is determined to be larger, adequate actuating force necessary to engage the clutch mechanism can be attained, and, thus according to the described subject matter of the electromagnetic clutch and the driving force transmitting apparatus, by setting the air gap to be greater, variations of the torque transmission characteristics of the electromagnetic clutch and the driving force transmitting apparatus for the vehicle can be restrained significantly. Further, according to the described subject matter of the electromagnetic clutch and the driving force transmitting apparatus for the vehicle, the pressure in the hydraulic chamber of the actuating force boosting mechanism can be sensed. By sensing the pressure in the hydraulic chamber, temperature characteristics for the torque transmission can be improved.

According to the described subject matter of the electromagnetic clutch and the driving force transmitting apparatus for the vehicle, the multiple plates type clutch having the plural inner clutch plates and outer clutch plates in which each of the inner clutch plate and each of the outer clutch plate is arranged alternately is adopted as the clutch mechanism, and the clutch mechanism is arranged in the clutch housing formed by the inner rotation member and the outer rotation member. Further, the actuating force transmitting member is arranged at the first side of the clutch mechanism fronting to the clutch housing, the thrust bearing is provided between the actuating force transmitting member and the clutch mechanism, and the return spring which returns the moving member to the initial position is provided between the supporting member and the moving member. According to the foregoing construction, the moving operation of the moving member which operates the actuating force transmitting member and the returning operation of the moving member which releases the operation of the actuating force transmitting member can be appropriately achieved.

With the construction of the described subject matter of the electromagnetic clutch and the power transmission for the vehicle, the plural electromagnetic coils are supported by the supporting member of the electromagnetic actuator. Accordingly, the actuating force applied to the clutch mechanism can be further enhanced. By adopting the actuating force boosting means, the number of the clutch plates can be reduced in the clutch mechanism to downsize the clutch mechanism, thus to downsize the electromagnetic clutch and the driving force transmitting apparatus for the vehicle.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electromagnetic actuator, comprising:
a supporting member, shaped in a disc form including a through hole that penetrates a center thereof, that supports an electromagnetic coil around which a wire is wound;
a moving member positioned facing the supporting member so as to move forward and backward; and
an actuating force transmitting member that transmits moving force of the moving member to a member to be actuated as an actuating force, wherein
the actuating force transmitting member includes a cylindrical portion provided radially inward from the supporting member and a disc shaped portion provided at an end of the cylindrical portion, such that the disc shaped portion is axially disposed between the supporting member and the member to be actuated,
the moving member is moved towards the supporting member by magnetic force generated by applying an electric current to the electromagnetic coil to apply the actuating force to the member to be actuated via the actuating force transmitting member,
the electromagnetic coil includes a plurality of electromagnetic coils provided at the supporting member, and
axial centers of the plurality of electromagnetic coils are arranged radially from a center of the supporting member at a predetermined radius.

2. The electromagnetic actuator according to claim 1, wherein the supporting member supports an even number of electromagnetic coils having an interval from each other in the circumferential direction, and each of the electromagnetic coils is arranged to have magnetic field which is generated in a reverse direction from magnetic fields of adjacent electromagnetic coils.

3. The electromagnetic actuator according to claim 1, wherein
the supporting member includes a yoke supporting the electromagnetic coils,
the moving member includes an armature configured to be attracted towards the supporting member by the magnetic force generated by applying the electric current to the electromagnetic coils, and
the supporting member and the moving member are made of magnetic material.

4. The electromagnetic actuator according to claim 1, wherein
the member to be actuated includes a clutch mechanism, and
the actuating force generated by a movement of the moving member towards the supporting member engages the clutch mechanism.

5. The electromagnetic actuator according to claim 4, wherein the supporting member and the moving member ensure a clearance therebetween and engaging force of the clutch mechanism is controlled by controlling an electric current applied to the electromagnetic coils.

6. The electromagnetic actuator according to claim 1, wherein
the supporting member includes a plurality of protrusions, and
said each electromagnetic coil is fitted to said each protrusion and is assembled to the supporting member while supported by a circle.

7. The electromagnetic actuator according to claim 1, wherein an air gap formed between the supporting member and the moving member is adjusted by a thickness of a spacer provided between the moving member and the actuating force transmitting member.

8. The electromagnetic actuator according to claim 1, wherein a surface of the supporting member and a surface of the moving member, which face each other and ensure a clearance therebetween defining a moving rate of the moving member relative to the supporting member, are tapered.

9. The electromagnetic actuator according to claim 1, wherein the moving member is connected to the supporting member via a connecting pin so as to move forward and backward by a predetermined rate in a state where a rotation of the moving member is restricted.

10. The electromagnetic actuator according to claim 9, wherein the connecting pin which connects the moving member to the supporting member, and the actuating force transmitting member which transmits the moving force of the moving member to the member to be actuated as the actuating force are made of non-magnetic material.

11. The electromagnetic actuator according to claim 9, wherein
the moving member is connected to the supporting member via the connecting pin so as to move forward and backward by the predetermined rate in a state where the rotation of the moving member is restricted and the moving member is prevented to displace, and the moving member forms an assembly together with the supporting member, and
the assembly is assembled to a case which covers the member to be actuated via the supporting member.

12. An electromagnetic clutch including the electromagnetic actuator according to claim 1, comprising:
a clutch mechanism positioned between an inner rotation member and an outer rotation member arranged coaxially to each other and relatively rotatable each other,
the actuating force is applied to the clutch mechanism via the actuating force transmitting member by moving the moving member towards the supporting member by magnetic force generated by applying the electric current to the electromagnetic coil, and
the cylindrical portion of the actuating force transmitting member is positioned penetrating through a central portion of the supporting member so as to move and between the clutch mechanism and the moving member, and pushes the clutch mechanism to operate to transmit a torque between the inner rotation member and the outer rotation member.

13. A driving force transmitting apparatus for a vehicle including the electromagnetic clutch according to claim 12, wherein
one of the inner rotation member and the outer rotation member adapted to be connected to a drive shaft and the other of the inner rotation member and the outer rotation member adapted to be connected to a driven shaft,
the actuating force transmitting member is positioned between the clutch mechanism and the moving member in a state where the cylindrical portion of the actuating force transmitting member penetrates through the central portion of the supporting member so as to move, and
the actuating force transmitting member operates the clutch mechanism to transmit torque between the inner rotation member and the outer rotation member and to connect the drive shaft and the driven shaft.

14. The driving force transmitting apparatus according to claim 13, wherein
the supporting member and the moving member of the electromagnetic clutch are integrally formed as an assembly via a connecting pin connecting the supporting member and the moving member, and
the assembly is assembled to a case which houses the driving force transmitting apparatus via the supporting member.

15. The driving force transmitting apparatus for the vehicle according to claim 13, wherein
the clutch mechanism includes a multi-plate type clutch including a plurality of inner clutch plates and a plurality of outer clutch plates in which each of the inner clutch plates and each of the outer clutch plates are arranged alternately,
the clutch mechanism is housed in a clutch housing formed by the inner rotation member and the outer rotation member,
the disc portion of the actuating force transmitting member positioned facing a first end of the clutch mechanism and contacting the clutch housing, and
a spring is provided between the actuating force transmitting member and one of the inner rotation member and the outer rotation member for ensuing a clearance between the clutch plates of the actuating force transmitting member.

16. An electromagnetic clutch including the electromagnetic actuator according to claim 1, comprising:
a clutch mechanism positioned between an inner rotation member and an outer rotation member arranged coaxially to each other and relatively rotatable each other wherein,
the actuating force is applied to the clutch mechanism via the actuating force transmitting member by moving the moving member towards the supporting member by magnetic force generated by applying the electric current to the electromagnetic coil,
the actuating force transmitting member includes a plurality of rod shaped members assembled to the moving member having an interval from one another in a circumferential direction, and
the rod shaped members are positioned penetrating through the supporting member liquid tight so as to move forward and backward therein and facing a first side of the clutch mechanism, and pushes the clutch mechanism to transmit torque between the inner rotation member and the outer rotation member.

17. The driving force transmitting apparatus including the electromagnetic clutch according to claim 16, wherein
one of the inner rotation member and the outer rotation member is adapted to be connected to a drive shaft and the other of which is adapted to be connected to a driven shaft,
the moving member moves towards the supporting member by the magnetic force generated by applying the electric current to the electromagnetic coil and applying the actuating force to the clutch mechanism via the actuating force transmitting member, and
the rod shaped members are positioned penetrating through the supporting member to be liquid tight and to move forward and backward therein and facing a first end of the clutch mechanism, and the rod shaped member operates the clutch mechanism to transmit torque through the inner rotation member and the outer rotation member to connect the drive shaft and the driven shaft.

18. The driving force transmitting apparatus for the vehicle according to claim 17, further comprising:
a double row angular ball bearing as a bearing supporting a tip end portion of a case housing the driving force transmitting apparatus on the outer rotation member.

19. The driving force transmitting apparatus for the vehicle according to claim 17, wherein each of the electromagnetic coils of the electromagnetic clutch is supported by the supporting member and is fixed to the supporting member at mating surfaces between a front side case portion and a rear side case portion of the case which houses the drive force transmitting apparatus.

20. A driving force transmitting apparatus for a vehicle comprising:
- a clutch mechanism positioned between an inner rotation member and an outer rotation member arranged coaxially to each other and relatively rotatable each other; and
- an electromagnetic actuator including
  - a supporting member that supports an electromagnetic coil around which a wire is wound;
  - a moving member positioned facing the supporting member so as to move forward and backward; and
  - an actuating force transmitting member that transmits moving force of the moving member to a member to be actuated as an actuating force, wherein
- the moving member is moved towards the supporting member by magnetic force generated by applying an electric current to the electromagnetic coil to apply the actuating force to the member to be actuated via the actuating force transmitting member,
- the electromagnetic coil includes a plurality of electromagnetic coils provided at the supporting member,
- axial centers of the plurality of electromagnetic coils are arranged radially from a center of the supporting member at a predetermined radius,
- the actuating force is applied to the clutch mechanism via the actuating force transmitting member by moving the moving member towards the supporting member by magnetic force generated by applying the electric current to the electromagnetic coil,
- the actuating force transmitting member includes a plurality of rod shaped members assembled to the moving member having an interval from one another in a circumferential direction,
- the rod shaped members are positioned penetrating through the supporting member liquid tight so as to move forward and backward therein and facing a first side of the clutch mechanism, and pushes the clutch mechanism to transmit torque between the inner rotation member and the outer rotation member,
- one of the inner rotation member and the outer rotation member is adapted to be connected to a drive shaft and the other of which is adapted to be connected to a driven shaft,
- the moving member moves towards the supporting member by the magnetic force generated by applying the electric current to the electromagnetic coil and applying the actuating force to the clutch mechanism via the actuating force transmitting member,
- the rod shaped members are positioned penetrating through the supporting member to be liquid tight and to move forward and backward therein and facing a first end of the clutch mechanism, and the rod shaped member operates the clutch mechanism to transmit torque through the inner rotation member and the outer rotation member to connect the drive shaft and the driven shaft, and
- the driving force transmitting apparatus includes a needle bearing provided at a tip end portion of said each rod shaped member and positioned facing a first end of the clutch mechanism.

21. An electromagnetic clutch, comprising:
- an electromagnetic actuator including
  - a supporting member that supports an electromagnetic coil around which a wire is wound,
  - a moving member positioned facing the supporting member so as to move forward and backward, and
  - an actuating force transmitting member that transmits moving force of the moving member to a member to be actuated as an actuating force, wherein the moving member is moved towards the supporting member by magnetic force generated by applying an electric current to the electromagnetic coil to apply the actuating force to the member to be actuated via the actuating force transmitting member,
  - the electromagnetic coil includes a plurality of electromagnetic coils provided at the supporting member,
  - the moving member is connected to the supporting member via a connecting pin so as to move forward and backward by a predetermined rate in a state where a rotation of the moving member is restricted, and
  - the connecting pin which connects the moving member to the supporting member, and the actuating force transmitting member which transmits the moving force of the moving member to the member to be actuated as the actuating force are made of non-magnetic material; and
- a clutch mechanism positioned between an inner rotation member and an outer rotation member which are positioned coaxially to each other and to be relatively rotatable each other, wherein
  - the moving member is moved towards the supporting member by magnetic force generated by applying the electric current to the electromagnetic coils to apply the actuating force to the clutch mechanism via the actuating force transmitting member so as to engage the clutch mechanism,
  - the supporting member is provided with a plurality of through holes formed in a circumferential direction having a predetermined interval from one another,
  - a plurality of connecting pins are provided at the moving member and positioned in the through holes of the supporting member respectively so as to slide in an axial direction and to be liquid tight,
  - the actuating force transmitting member is arranged between the supporting member and the clutch mechanism to be liquid tight and to be slidable in an axial direction and forms a hydraulic chamber in each of the through holes together with each of the connecting pins,
  - a hydraulic pressure type actuating force boosting mechanism is arranged between the supporting member, the moving member, and the actuating force transmitting member; and the hydraulic pressure type actuating force boosting mechanism includes each of the through holes of the supporting member as a hydraulic chamber, each of the connecting pins as a first piston, and the actuating force transmitting member as a second piston, and
  - the actuating force of the moving member is boosted by the hydraulic pressure type actuating force boosting mechanism and transmitted to the clutch mechanism.

22. The electromagnetic clutch according to claim 21, wherein a boosting ratio of the hydraulic pressure type actuating force boosting mechanism is determined on the basis of dimension ratio between facing sides of each of the first pistons and each of the second pistons.

23. The electromagnetic clutch according to claim 21, wherein the supporting member of the hydraulic pressure type actuating force boosting mechanism includes a plurality of protrusions positioned having a predetermined interval in a circumferential direction from one another and protruding towards the moving member;

the protrusions support the electromagnetic coils respectively; and the through hole forming the hydraulic chamber of the hydraulic pressure type actuating force boosting mechanism is formed on each of the protrusions.

* * * * *